(12) United States Patent
Kaszubski et al.

(10) Patent No.: US 7,569,634 B2
(45) Date of Patent: Aug. 4, 2009

(54) CURABLE ADHESIVE COMPOSITION, ADHESIVE KIT AND METHOD OF ADHERING SUBSTRATES

(75) Inventors: Glen Kaszubski, Copley, OH (US);
John A. Paul, Wickliffe, OH (US);
Mark Stypczynski, Berea, OH (US);
Leo August Tischer, Parma, OH (US)

(73) Assignee: The Glidden Company, Strongsville, OH (US)

( * ) Notice: Subject to any disclaimer, the term of this patent is extended or adjusted under 35 U.S.C. 154(b) by 557 days.

(21) Appl. No.: 11/095,417

(22) Filed: Mar. 31, 2005

(65) Prior Publication Data
US 2005/0211580 A1    Sep. 29, 2005

Related U.S. Application Data

(63) Continuation-in-part of application No. 10/075,203, filed on Feb. 14, 2002, now Pat. No. 7,211,616.

(60) Provisional application No. 60/565,002, filed on Apr. 23, 2004, provisional application No. 60/557,859, filed on Mar. 31, 2004.

(51) Int. Cl.
*C08K 3/36* (2006.01)
*C08J 9/32* (2006.01)

(52) U.S. Cl. .................. 524/493; 524/588; 524/866; 523/218; 523/219; 528/32

(58) Field of Classification Search .......... 523/493, 523/523, 885; 528/32
See application file for complete search history.

(56) References Cited

U.S. PATENT DOCUMENTS 2,784,127 A    3/1957  Joyner et al.
3,260,637 A    7/1966  von Bramer
3,527,841 A    9/1970  Wicker Jr. et al.
3,722,599 A    3/1973  Robertson et al.

(Continued)

FOREIGN PATENT DOCUMENTS

EP    0 106 330 A1    4/1984

(Continued)

OTHER PUBLICATIONS

WWW. Loctite.com, Choose-A-Glue, 2008.*

(Continued)

*Primary Examiner*—Tae H Yoon
(74) *Attorney, Agent, or Firm*—Timothy D. Meade

(57) ABSTRACT

A curable adhesive composition kit and method of adhering substrates is provided having three basic adhesives and up to three additional optional adhesives. The basic adhesives include: at least one curable silicone end group-containing adhesive; at least one curable cyanoacrylate adhesive, and at least one curable epoxy adhesive. The optional adhesives can be one or more of the following: contact adhesive, urethane adhesive, polyvinylacetate adhesive, and pressure sensitive adhesive. The kit system also can have a selection guide for the adhesives in the system based on substrate types or substrate types and use conditions. Optionally a guide for using the adhesives in repairing adherends can be included in the kit. Also optionally the selection guide and/or the repair guide can be in an interactive program on a web site on a computer network such as the internet.

12 Claims, 4 Drawing Sheets

U.S. PATENT DOCUMENTS

| | | | |
|---|---|---|---|
| 3,836,377 A | | 9/1974 | Delahunty |
| 3,940,362 A | | 2/1976 | Overhults |
| 3,990,928 A | | 11/1976 | Schmidt-Hellerau et al. |
| 3,995,641 A | | 12/1976 | Kronenthal et al. |
| 4,082,903 A | | 4/1978 | Chow |
| 4,139,693 A | | 2/1979 | Schoenberg |
| 4,308,621 A | | 12/1981 | Mendelson |
| 4,426,243 A | | 1/1984 | Briggs |
| 4,460,759 A | | 7/1984 | Robins |
| 4,593,068 A | | 6/1986 | Hirose et al. |
| 4,760,123 A | * | 7/1988 | Imai et al. ............... 528/18 |
| 4,822,426 A | | 4/1989 | Ito et al. |
| 4,979,993 A | | 12/1990 | Okamoto et al. |
| 5,259,835 A | | 11/1993 | Clark et al. |
| 5,298,572 A | * | 3/1994 | Katz ................... 525/419 |
| 5,304,621 A | * | 4/1994 | Staiger et al. ............ 528/12 |
| 5,328,687 A | | 7/1994 | Leung et al. |
| 5,373,035 A | * | 12/1994 | Uemura et al. ........... 523/212 |
| 5,419,797 A | | 5/1995 | Ciamaga |
| 5,459,205 A | | 10/1995 | Furukawa et al. |
| 5,498,643 A | | 3/1996 | Antonucci |
| 5,514,371 A | | 5/1996 | Leung et al. |
| 5,514,372 A | | 5/1996 | Leung et al. |
| 5,575,997 A | | 11/1996 | Leung et al. |
| 5,582,834 A | | 12/1996 | Leung et al. |
| 5,624,669 A | | 4/1997 | Leung et al. |
| 5,928,611 A | | 7/1999 | Leung |
| 5,952,071 A | * | 9/1999 | Rijsdijk et al. ............ 428/58 |
| 6,013,749 A | | 1/2000 | Baba et al. |
| 6,165,488 A | | 12/2000 | Tardy |
| 6,425,704 B2 | | 7/2002 | Voiers |
| 6,686,047 B2 | | 2/2004 | Yamaguchi et al. |
| 6,730,299 B1 | | 5/2004 | Tayot |
| 2002/0099725 A1 | | 7/2002 | Gordon |
| 2003/0050359 A1 | | 3/2003 | Kimura |
| 2003/0108228 A1 | | 6/2003 | Garnier |
| 2003/0153671 A1 | | 8/2003 | Kaszubski et al. |
| 2004/0116547 A1 | | 6/2004 | Bennington |
| 2005/0009946 A1 | | 1/2005 | Oguri |

FOREIGN PATENT DOCUMENTS

| | | |
|---|---|---|
| EP | 0 442 380 B1 | 8/1991 |
| EP | 0 673 972 A1 | 9/1995 |
| EP | 0 857 771 A2 | 8/1998 |
| EP | 1 041 119 A2 | 10/2000 |
| EP | 1116765 A2 | 1/2001 |
| EP | 1 279 709 A1 | 1/2003 |
| FR | 2754267 | 10/1996 |
| FR | 2796558 | 7/1999 |
| JP | 2001-311056 A | 11/2001 |
| JP | 2004-043427 A | 2/2004 |
| WO | WO 94/06877 | 3/1994 |
| WO | WO 94/06877 A1 | 3/1994 |
| WO | WO 96/11799 | 4/1996 |
| WO | WO 96/11799 A1 | 4/1996 |
| WO | WO 00/37534 A1 | 6/2000 |
| WO | WO 02/43669 A1 | 11/2000 |
| WO | WO 03/000818 A2 | 1/2003 |
| WO | WO 03/068886 A1 | 8/2003 |

OTHER PUBLICATIONS www.thistothat.com, Because People Have A Need to Glue Things to Other Things, web page, Copyright 1999-2001.

Henkel Consumer Adhesives, Choose-a-Glue Helps Consumers Identify the Right Adhesive for the Job, web page, Nov. 14, 2001.

Abstract of JP 2001-311056 A from EPO on-line data base esp@cenet. 2001.

Abstract of JP 2004-043427 A from EPO on-line data base esp@cenet. 2004.

ASTM D 907, "Standar Terminology of Adhesives," Mar. 1996, 9 pages.

ASTM D 1002, Standard Test Method for Apparent Shear Strength of Single-Lap-Joint Adhesively Bonded Metal Specimens by Tension Loading (Metal-to-Metal), Apr. 1994, 5 pgs.

ASTM D 1084, "Standard Test Methods for Vicosity of Adhesives," Oct. 1988, 5 pages.

ASTM D 1490, "Standard Test Method for Nonvolatile Content of Urea-Formaldehyde Resin Solutions," Oct. 1993, 2 pages.

ASTM D 3121, "Standard Test Method for Tack of Pressure-Sensitive Adhesives by Rolling Ball," Feb. 1995, 3 pages.

ASTM D4672, "Standard Test Method of Polyurethane Raw Materials: Determiniation of Water Content of Polyols," Jan. 1996, 4 pgs.

www.perfectglue.com website from home page. 2009.

Product Brochure, "MS Polymer Silyl," Kaneka Corporation, 1999, 16 pages.

International Search Report for International Application No. PCT/US2005/010621 dated Aug. 3, 2005.

International Preliminary Report on Patnetability for International Application No. PCT/US2005/010621 dated Feb. 22, 2006.

Written Opinion for International Application No. PCT/US2005/010621 dated Aug. 2, 2005.

International Search Report for International Application No. PCT/US03/04355 dated Jul. 2, 2003.

* cited by examiner

| | 24 | 25 | 26 | 27 | 28 | 29 | 30 | 31 | 32 | 33 | 34 |
|---|---|---|---|---|---|---|---|---|---|---|---|
| 12 | 1 | 1 | 1 | 1 | 1 | 1 | 1 | 1 | 1 | 1 | 1 |
| 13 | 1 | 1 | 1 | 1 | 1 | 1 | 1 | 1 | 1 | 1 | 1 |
| 14 | 1 | 1 | 1 | 1 | 1 | 1 | 1 | 1 | 1 | 1 | 1 |
| 15 | 1 | 1 | 1 | 2 | 1 | 2 | 2 | 1 | 1 | 1 | 1 |
| 16 | 1 | 1 | 1 | 1 | 1 | 1 | 1 | 2 | 2 | 1 | 1 |
| 17 | 1 | 1 | 1 | 2 | 1 | 1 | 2 | 2 | 3 | 1 | 1 |
| 18 | 1 | 1 | 1 | 2 | 1 | 2 | 2 | 2 | 3 | 3 | 1 |
| 19 | 1 | 1 | 1 | 1 | 2 | 2 | 2 | 2 | 2 | 3 | 3 |
| 20 | 1 | 1 | 1 | 1 | 2 | 3 | 2 | 3 | 3 | 3 | 3 |
| 21 | 1 | 1 | 1 | 1 | 1 | 1 | 3 | 3 | 3 | 3 | 3 |
| 22 | 1 | 1 | 1 | 1 | 1 | 1 | 1 | 3 | 3 | 3 | 3 |

Fig 2

| | 24 | 25 | 26 | 27 | 28 | 29 | 30 | 31 | 32 | 33 | 34 |
|---|---|---|---|---|---|---|---|---|---|---|---|
| 12 | 1 | 1 | 1 | 1 | 1 | 1 | 1 | 1 | 3 | 3 | 3 |
| 13 | 1 | 1 | 1 | 1 | 1 | 1 | 1 | 1 | 1 | 1 | 1 |
| 14 | 1 | 1 | 1 | 1 | 1 | 1 | 1 | 1 | 1 | 1 | 1 |
| 15 | 1 | 1 | 1 | 2 | 1 | 2 | 1 | 2 | 2 | 1 | 1 |
| 16 | 1 | 1 | 1 | 1 | 1 | 3 | 1 | 1 | 3 | 3 | 1 |
| 17 | 1 | 1 | 1 | 2 | 3 | 2 | 3 | 2 | 3 | 3 | 3 |
| 18 | 1 | 1 | 1 | 1 | 1 | 3 | 2 | 3 | 3 | 3 | 1 |
| 19 | 1 | 1 | 1 | 2 | 1 | 2 | 3 | 2 | 3 | 3 | 3 |
| 20 | 3 | 1 | 1 | 2 | 3 | 3 | 3 | 3 | 3 | 3 | 3 |
| 21 | 3 | 1 | 1 | 1 | 3 | 3 | 3 | 3 | 3 | 3 | 3 |
| 22 | 3 | 1 | 1 | 1 | 1 | 3 | 3 | 3 | 3 | 3 | 3 |

|    | 24 | 25 | 26 | 27 | 28 | 29 | 30 | 31 | 32 | 33 | 34 |
|----|----|----|----|----|----|----|----|----|----|----|----|
| 12 | 1  | 1  | 1  | 1  | 1  | 1  | 1  | 1  | 1  | 1  | 1  |
| 13 | 1  | 1  | 1  | 1  | 1  | 1  | 1  | 1  | 1  | 1  | 1  |
| 14 | 1  | 1  | 1  | 1  | 1  | 1  | 1  | 1  | 1  | 1  | 1  |
| 15 | 1  | 1  | 1  | 2  | 1  | 2  | 2  | 1  | 1  | 1  | 1  |
| 16 | 1  | 1  | 1  | 1  | 1  | 1  | 1  | 2  | 2  | 1  | 1  |
| 17 | 1  | 1  | 1  | 2  | 1  | 1  | 2  | 2  | 3  | 1  | 1  |
| 18 | 1  | 1  | 1  | 2  | 1  | 2  | 2  | 2  | 3  | 3  | 1  |
| 19 | 1  | 1  | 1  | 1  | 2  | 2  | 2  | 2  | 2  | 3  | 3  |
| 20 | 1  | 1  | 1  | 1  | 2  | 3  | 3  | 2  | 3  | 3  | 3  |
| 21 | 1  | 1  | 1  | 1  | 1  | 1  | 3  | 3  | 3  | 3  | 3  |
| 22 | 1  | 1  | 1  | 1  | 1  | 1  | 3  | 3  | 3  | 3  | 3  |

Fig 5

|    | 24 | 25 | 26 | 27 | 28 | 29 | 30 | 31 | 32 | 33 | 34 |
|----|----|----|----|----|----|----|----|----|----|----|----|
| 12 | 1  | 1  | 1  | 1  | 1  | 1  | 1  | 1  | 3  | 3  | 3  |
| 13 | 1  | 1  | 1  | 1  | 1  | 1  | 1  | 1  | 1  | 1  | 1  |
| 14 | 1  | 1  | 1  | 1  | 1  | 1  | 1  | 1  | 1  | 1  | 1  |
| 15 | 1  | 1  | 1  | 2  | 1  | 2  | 1  | 2  | 2  | 1  | 1  |
| 16 | 1  | 1  | 1  | 1  | 1  | 3  | 1  | 1  | 3  | 3  | 1  |
| 17 | 1  | 1  | 1  | 2  | 3  | 2  | 3  | 2  | 3  | 3  | 3  |
| 18 | 1  | 1  | 1  | 1  | 1  | 3  | 2  | 3  | 3  | 3  | 1  |
| 19 | 1  | 1  | 1  | 2  | 1  | 2  | 3  | 2  | 3  | 3  | 3  |
| 20 | 3  | 1  | 1  | 2  | 3  | 3  | 3  | 3  | 3  | 3  | 3  |
| 21 | 3  | 1  | 1  | 1  | 3  | 3  | 3  | 3  | 3  | 3  | 3  |
| 22 | 3  | 1  | 1  | 1  | 1  | 3  | 1  | 3  | 3  | 3  | 3  |

CURABLE ADHESIVE COMPOSITION, ADHESIVE KIT AND METHOD OF ADHERING SUBSTRATES

This application claims the benefit including that of priority of U.S. Provisional Patent Applications Ser. No. 60/557,859, filed on Mar. 31, 2004, entitled "Curable Adhesive Composition Kit and Method of Adhering Substrates" and Ser. No. 60/565,002 filed on Apr. 23, 2004, entitled, "Curable Adhesive Composition Kit and Method of Adhering Substrates", the complete disclosures of which are hereby incorporated by reference. This application is also a continuation-in-part patent application of U.S. application Ser. No. 10/075,203 filed Feb. 14, 2002 entitled, "Moisture Curable Adhesives", and issued as U.S. Pat. No. 7,211,616, on May 1, 2007, the disclosure of which is hereby incorporated by reference.

The present invention relates to a kit of curable adhesive compositions for adhering most common substrates and method for adhering substrates.

The adhesives industry has provided the marketplace with numerous types of adhesives for joining, fastening and/or repairing adherends. The same or different types of adherend that, from time to time, may need repaired, joined, and/or fastened with adhesives include: wood, metals, paper, ceramics, stone, glass, concrete, fabric, rubber, plastic, ceramic, masonry and the like. Adherends are considered as being any one or more of such materials, which are the same or different types of materials, in one piece with a hole or tear or two or more pieces to be joined together by various techniques. These joining techniques range from overlapping and butt joining adherends to patching a hole in the adherend.

A plethora of adhesives products populate the marketplace where some adhesives have particular end use characteristics for particular adherends. Currently available adhesives are based on a wide range of technologies, including elastomer/solvent/resin mixtures, epoxies, latexes, polyurethanes, silicones, cyanoacrylates, acrylics, hot melts, and others. These adhesives each have advantages and disadvantages for particular adherends under particular use conditions.

Adhesives based on elastomer/solvent/resin mixtures, henceforth referred to as rubber-based adhesives, contain solvents which are toxic and, most often, flammable. Despite these hazards, rubber-based adhesives are popular due to their ease of use. Epoxy, acrylic, some polyurethane, and some silicone adhesives are formulated into two-component systems consisting of a base containing monomers, oligomers, and polymers, and a hardener or curative component, consisting of catalysts and curing agents. These systems require accurate measuring and thorough mixing to develop the properties that make them useful as adhesives. The individual raw materials in two-component adhesive products, monomers, oligomers, catalysts, and curing agents, can be toxic and often allergenic. Latex adhesives are low in toxicity, and have mostly non-flammable materials, which harden with the evaporation of water. While effective in many applications, latex adhesives do not perform well in low temperature environments, on metals, on many plastics, and in wet or humid environments. In conditions of low temperature or high humidity, the drying time of latex adhesives can be greatly extended, sometimes for days. On the other hand, hot melt adhesives, being thermoplastic by definition, lose strength in warm conditions, limiting the applications in which they can be used. Additionally, hot melt adhesives require a source of heat for application, which further limits their use. These heat sources and the application of hot adhesive present a safety (burn) hazard to the user. Single component adhesives, such as polyurethanes and silicones, cure by reaction with moisture in air or on the adherends. Polyurethanes develop tack slowly, requiring that the adherends be held or fixtured in place (bracing or taping) until the adhesive has cured enough to hold them in place without being held. The same applies for single component silicone adhesives. Further, in a portion of the population, allergic reactions can result from exposure to polyurethane adhesives. In addition to the problems listed above, solvent and water based adhesives generally exhibit a high degree of shrinkage due to the volatile content of the adhesives.

The longevity and durability of adhesive bonding is dependent on a number of factors, including but not limited to surface properties of the adherends, the type and properties of the adhesive used in the bonding application, environmental conditions (temperature, humidity, etc.), the design of the adhesive joint, and the method of joining or assembling the adhesive and adherends together. High solids content adhesives solve some of the problems encountered with these other types of adhesives (i.e., shrinkage, amount of volatiles, etc), however the best of these adhesives present other drawbacks. For instance, European Patent 0 442 380 B 1 describes the use of a high solids content moisture curable adhesive with which two adherends can be bonded together. The patent description, however, indicates if the adhesive is applied too thickly, the adhesive cannot form a sufficient tacking force (tackiness), and has limited contact ability. It is therefore advisable that the adhesive be applied in the thickness of approximately 1 mm or less so as to increase the tack.

The need to apply a thin layer of adhesive limits the applications an adhesive can be used for, and the means (i.e., roller, etc) for applying the adhesive. To apply thin layers of adhesives it is helpful to have an adhesive that can maintain its adhesive properties, and will spread and flow across the substrate or adherend. If the viscosity of the adhesive is too high it can be difficult or impossible to apply a thin layer of adhesive (layers of 1 mm or less). One of the factors which influences the viscosity of an adhesive is the amount of filler in the adhesive. In general, the higher the filler content the higher the viscosity. Filler content can also affect the tack of the adhesive. At higher filler contents, the tack is generally lower. Therefore, to get a high solids content adhesive with sufficient tack and a low enough viscosity to spread thinly it has been necessary to use formulations with relatively low filler content. Further, it has been difficult to even add filler to high solids content clear adhesives since most filler including clear fillers will either block or refract light passing through an adhesive making the adhesive appear unclear. There is, however, a great need to increase the filler content of an adhesive since a higher filler content lowers the cost of an adhesive.

Another problem associated with most good adhesives has been the repositionability of the adherends bonded by the adhesives. Conventionally, once an adhesive had developed enough tack to bond two adherends without clamps or some other type of temporary fasteners, then it was difficult to reposition the adhesive after contacting the adherends after more than a couple minutes. A need therefore exists for an adhesive, which develops tack rapidly so the two adherends to be bonded by the adhesive can be joined and held together without the use of clamps after a relatively short period of time, but where after joining the two adherends can be repositioned with respect to one another for a relatively long period of time.

There is a need in the adhesive art to rationalize the number of adhesive compositions available for adhering most common adherends in a facile manner and to provide a system of such adhesives with a limited number of adhesives and a system for the use of such a kit of adhesives to accomplish most common adhering needs in most non-heavy industrial applications. This need is one among the many problems solved by the present invention.

SUMMARY OF THE INVENTION

The present invention is directed to a system of curable, adhesives having a kit of up to 6 different types of curable adhesive formulations several if not all of which are thermosetting adhesives and a process for selecting the recommended curable adhesive formulation of the system for most common adherends to be bonded in every day non-heavy industrial applications. These common adherends are those that are capable of bonding with adhesives. The adhesive system of a kit of at least ambient curable adhesives includes: one or more moisture curable adhesive formulations having at least one polymer which contains one or more reactive silicone end group; one or more cyanoacrylate types of curable adhesives; one or more curable one-part or two part epoxy-containing adhesives; and, optionally, up to three additional types of ambient curing adhesives. The up to three additional adhesives can be selected from the group of contact cement type adhesives, urethane type adhesives, polyvinylacetate ("PVA") type adhesives, and pressure sensitive type adhesives("PSA"). The curable adhesives of the kit can have monomeric (including pre-polymeric materials, polymeric materials or mixtures thereof. The monomer (including pre-polymeric) adhesive composition may include one or more polymerizable monomers. The kit of the adhesive system can have each curable adhesive individually packaged or can include more than one type of curable adhesive in a package. The instructional process for matching the types of surface materials with the recommended adhesive can accompany the package of the one or more adhesives as a matrix chart or list or can be separate from the packaging as in an interactive internet web page or site.

In one embodiment of the present invention the curable silicone end group-containing adhesive which is at least ambient curing can have, based on the total weight of the moisture curable adhesive composition, from about 5% to about 98% by weight polymer which contains a reactive silicone end group, and from about 0.01% to about 4% catalyst. The moisture curable adhesive composition optionally includes either or both of from about 5 to about 90 weight percent of a filler and/or from about 0.01% to about 10% by weight dehydrating agent, based on the total weight of the moisture curable adhesive composition. The dehydrating agent assists in maintaining a stable adhesive composition prior to reaction with moisture. Generally the cyanoacrylate type of at least ambient curing adhesive can be a rapid setting material curable through polymerization of cyanoacrylate that is catalyzed in the presence of even minute amounts of an initiator. Initiators include moisture present in the air or on moist surfaces of adherends, even surfaces such as animal (including human) tissue, or anionic materials such as hydroxyl- or amine-containing compounds. Generally the ambient curable epoxy-containing adhesive, which can be a single or double pack or component system, is solvent or water based and curable to a thermoset with a latent type hardener for one-pack adhesives or amine type hardeners for two pack type adhesives. Generally the contact cement type adhesive includes rubber cements such as those based on neoprene, isobutylene and the like, where the adhesive has the ability to form a bond by mating two coated surfaces together. Such adhesives generally are applied with a solvent and when the solvent evaporates and after the surfaces have become relatively tack free, they are mated together under enough pressure to result in good contact. The resulting bond is immediately strong enough to hold. Generally the PVA type of adhesive can be water based with or without a catalytic hardener and or plasticizer. Generally the urethane type adhesives are polyurethane pre-polymers with capped or latent crosslinkable materials such as polyols and/or di-isocyanates like monomeric and/or homopolymers of diphenylmethane-diisocyanate and the like. The PSA adhesives can coat adherends that are to be easily attachable to another adherend by the application of pressure alone. Many PSA compositions have a balance of one or more properties such as tackiness at the temperature of use, adhesion (peel resistance), cohesion (shear resistance), elongation, elasticity, color clarity and color stability, and resistance to sunlight and other ultraviolet and degrading radiation sources. The ambient cure pressure-PSA compositions are polymer solutions or dispersions of a polymer in an aqueous medium.

BRIEF DESCRIPTION OF THE DRAWINGS

FIG. 2 through and including FIG. 5 comprise a series of matrix charts similar to that of FIG. 1 except that the matrix chart of each Figure is an arrangement of the adhesives of the system that is recommended for the adherents at the intersection of the row and column of the chart in response to a particular condition of use for the adhesive. The condition of use is different for each Figure.

DETAILED DESCRIPTION OF THE INVENTION

Figure 1:
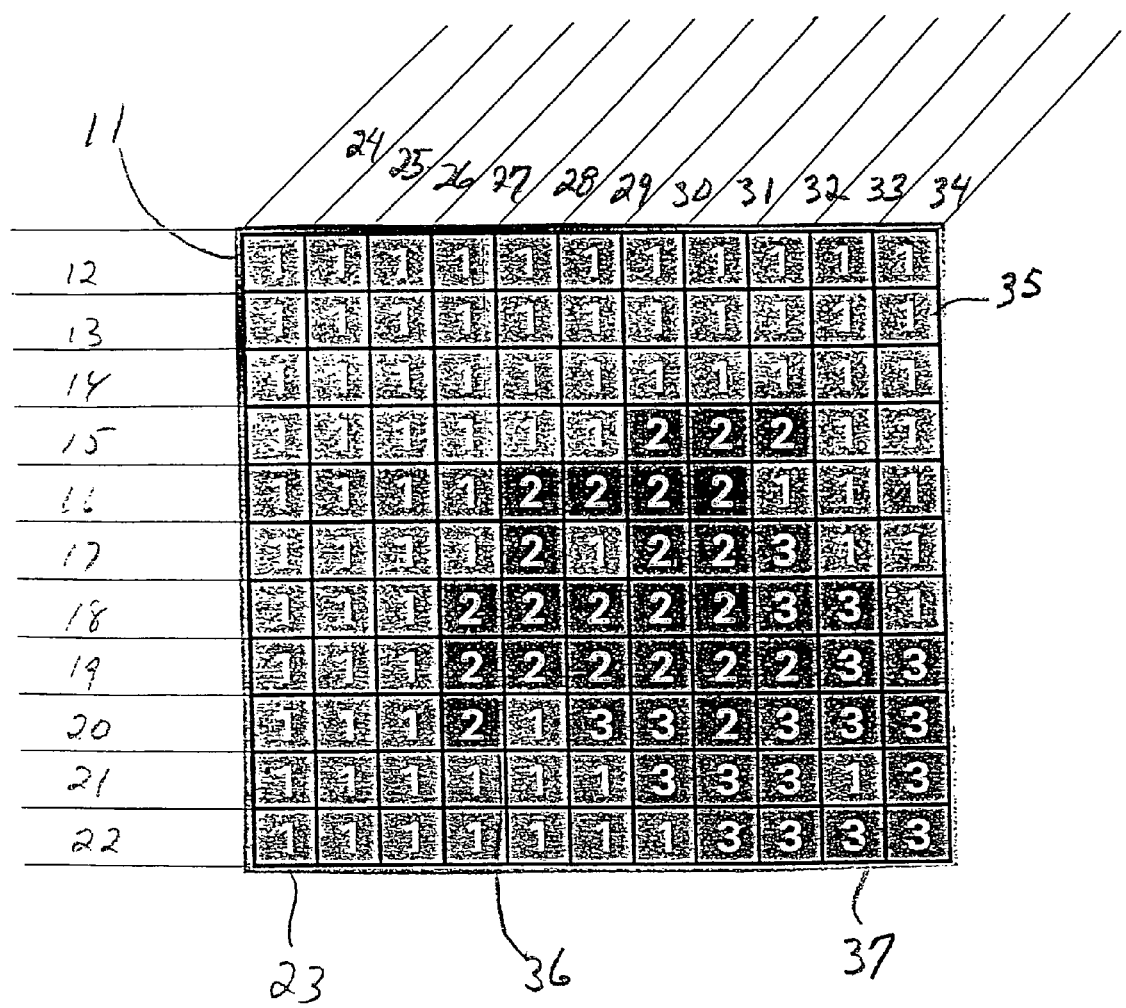
FIG. 1 is a matrix chart where the types of adherends to be bonded are listed in any order but preferably in the same order on each of the x and y axis. An example is as shown in FIG. 1 where the listing order is: Leather/Vinyl, Styrofoam Material, Paper, Fabric, Glass, Rubber, Plastic, Ceramic/China, Metal, Wood, Masonry/Stone. At the intersection of each row and column from the x and y axes, a numeral is displayed as a symbol of which type of adhesive of the system is recommended for the intersecting types of adherends. The plurality of adhesives in the embodiment for the system depicted in FIG. 1 is for three adhesives. Herein the term "matrix" means a rectangular arrangement of symbols in rows and columns where the symbols express recommended adhesive for the substrates of the intersecting row and column without conditions of use for FIG. 1 and for at least one particular condition of use per Figure for FIGS. 2-5.

In the description other than in the operating examples, or where otherwise indicated, all numbers expressing quantities of ingredients, reaction conditions, dimensions, physical characteristics, processing parameters and so forth used in the specification and claims are to be understood as being modified in all instances by the term "about". Accordingly, unless indicated to the contrary, the numerical values set forth in the following specification and claims may vary depending upon the desired properties sought to be obtained by the present invention. At the very least, and not as an attempt to limit the application of the doctrine of equivalents to the scope of the claims, each numerical value should at least be construed in light of the number of reported significant digits and by applying ordinary rounding techniques. Moreover, all ranges disclosed herein are to be understood to encompass the beginning and ending range values and any and all subranges subsumed therein. For example, a stated range of "1 to 10" should be considered to include any and all subranges between (and inclusive of) the minimum value of 1 and the maximum value of 10; that is, all subranges beginning with a minimum value of 1 or more and ending with a maximum value of 10 or less, e.g., 5.5 to 10.

Also any numeric references to amounts, unless otherwise specified, are "by weight". Molecular weight quantities, whether Mn or Mw, are those determinable from gel permeation chromatography using polystyrene as a standard. The term "equivalent weight" is a calculated value based on the relative amounts of the various ingredients used in making the specified material and is based on the solids of the specified material. The relative amounts are those that result in the theoretical weight in grams of the material, like a polymer, produced from the ingredients and give a theoretical number of the particular functional group that is present in the resulting polymer. The theoretical polymer weight is divided by the theoretical number to give the equivalent weight. For example, hydroxyl equivalent weight is based on the equivalents of reactive pendant and/or terminal hydroxyl groups in the hydroxyl-containing polymer.

For convenience in describing the invention, the following terms used herein will have at least the meanings designated below. These meanings are for illustrative purposes and do not limit meanings known to those skilled in the art to include the meanings below or to expand upon the meanings below.

The term "adhesive bond" means the union of materials by adhesives. For instance, the adhesive bond can be further described as having a bond strength in shear of a minimum of 30 pounds per square inch (207 kPa).

The term "bond strength" means the unit load applied to tension, compression, flexure, peel, impact, cleavage, or shear required to break an adhesive assembly with failure occurring in or near the plane of the bond.

The term "common materials" refers to, but are not solely limited to, wood, paper, fabric, rubber, leather, vinyl, expanded polystyrene, glass, ceramics, aluminum, steel, copper, stone, elastomers, rubber, fiber reinforced plastics, polyethylene, polypropylene, and fabrics.

The term "polymer" is meant to include oligomers and both homopolymers and copolymers.

The term "film-forming" means that the film-forming polymer or polymeric or adhesive composition forms a self-supporting continuous film on at least a horizontal surface of a substrate upon at least drying at ambient temperature and also includes oligomeric or polymeric materials that upon removal of any solvents or carriers present in the polymer emulsion, dispersion, suspension or solution, can coalesce to form a film on at least a horizontal surface of a substrate and are capable of curing into a continuous film.

The term "cure" as used in connection with a composition, e.g., "a cured composition," shall mean that at least a portion of the crosslinkable components which form the composition are at least partially crosslinked. In certain embodiments of the present invention, the crosslink density of the crosslinkable components, i.e., the degree of crosslinking, ranges from 5% to 100% of complete crosslinking. One skilled in the art will understand that the presence and degree of crosslinking, i.e., the crosslink density, can be determined by a variety of methods, such as dynamic mechanical thermal analysis (DMTA) using a TA Instruments DMA 2980 DMTA analyzer conducted under nitrogen. This method determines the glass transition temperature and crosslink density of free films of coatings or polymers. These physical properties of a cured material are related to the structure of the crosslinked network.

The spatial or directional terms, such as "left", "right", "inner", "outer", "above", "below", "top" "bottom" "over", "on", and the like have their usual dictionary meaning. However, it is to be understood that the invention may assume various alternative orientations and, accordingly, such terms are not to be considered as limiting. The terms "flat" or "substantially flat" substrate refer to a substrate that is substantially planar in form; that is, a substrate lying primarily in a single geometric plane, which substrate, as would be understood by one skilled in the art, can include slight bends, projections, or depressions therein.

The term "one-part curable epoxy composition" shall mean an integral composition which contains curable epoxy-containing polymer and other components at least one of which is a curative which is prepared for latent activation i.e. after application.

The term "ambient-temperature-stable" with respect to the polymeric material shall mean that the polymeric material is stable under any of a wide variety of storage conditions which may range from −20. degree. C. or lower up to and including any elevated temperatures required for processing the curable composition, e.g., to provide an adhesive bond for adherends.

The term "miscible" shall mean with respect to the interaction of a curative to the polymer shall mean that the curative at ambient temperature is sufficiently dispersed within the polymer to facilitate complete curing of the polymer.

The term "solid" with respect to the physical condition of the cured adhesive shall mean the cured adhesive is a solid material, i.e., neither gaseous nor liquid under ambient temperature conditions.

The term "latent curative" shall mean a curing agent or initiator that has been rendered temporarily inactive so that it will not, under storage and processing conditions, cause curing of adhesive due to its being stabilized by chemical reaction to produce a chemical complex, being embedded within a material that provides a physical barrier (e.g., a thermoplastic polymer shell), or being inherently immiscibility and/or non-reactive.

The term "curative" shall mean a compound that will initiate the curing of the polymer in the adhesive, such as a hardener or accelerator.

The term "hardener" shall mean a curative having functionality including multiple functionality capable of cross linking the polymer of the adhesive.

The term "accelerator" shall mean a curative that promotes the rapid cure of the polymer in the adhesive either alone or in combination with the hardener.

The term "plasticize" shall mean impart flexibility and toughness to at least a portion of the cured adhesive.

The term "tack" is herein defined according to ASTM D 907 as the property of an adhesive that enables it to form a bond of measurable strength immediately after adhesive and an adherend are brought into contact under low pressure. Tack can be measured by the Rolling Ball Tack Test according to ASTM D 3121.

The term "incorporated by reference" refers to patents, published patent applications, and other publications referred to in this description and specification for all that it or they disclose or teach unless indicated otherwise.

The one or more moisture curable adhesive formulation having at least one polymer which contains one or more reactive silicone end group for the adhesive system of the present invention is described in U.S Patent Application Publication No. 20030153671 and Patent Cooperation Treaty ("PCT") patent application 03068886 published Aug. 21, 2003, both hereby incorporated by reference. This adhesive formulation is indicated with the reference number "1" in FIGS. 1-5. Suitable polymers which can contain the reactive silicone end groups include, but are not limited to, any polyalkyl oxide, including but not limited to, polyethers; any polyalkane, polyalkenes, and polyalkynes; substituted alkyl monomers, such as, for example, styrene; acrylics; any polymer or copolymer that can be prepared with the silyl (reactive silicone) end groups; and combinations thereof. Suitable reactive silicone end groups include but are not limited to: triethoxysilanes, methyldiethoxysilanes, trisilanols, any alkoxysilane, substituted silanes, multi-silanols, and any combinations thereof. Examples of catalysts which may be used include, but are not limited to, tertiary amine catalysts, tin catalysts, lead catalysts, bismuth catalysts and mixtures thereof. Also the adhesive composition with the polymer as described above can be essentially free of undesirable volatiles. Also, the moisture curable adhesive composition herein can optionally include a dehydrating agent, filler and/or an adhesion promoter.

The moisture curable adhesive composition of reference number 1 includes, but is not limited to, having one or more of the following catalysts: tertiary amine catalysts, tin catalysts, lead catalysts, bismuth catalysts and mixtures thereof. Tertiary amine catalysts include, by way of example and not limitation, compounds having one tertiary nitrogen atom including triethylamine, N,N-dimethylcyclohexylamine, N-methylmorpholine, N-ethylmorpholine, N-(2-hydroxyethyl)morpholine, N,N-dimethyl-p-toluidine, β-(dimethylamino)propionitrile, N-methylpyrrolidone, N,N-dicyclohexylmethylamine, and the like; compounds having two tertiary nitrogen atoms including N,N,N',N'-tetramethylethylenediamine, N,N,N',N'-tetramethylpropane-1,3-diamine, N,N,N',N'-tetramethylhexane-1,6-diamine, bis (N,N-dimethylaminoethyl)ether, bis(2-dimethylaminoethyl)ether, ethylene glycol bis(3-dimethyl)aminopropyl ether, N'-cyclohexyl-N,N-dimethylformamidine, N,N'-dimethylpiperazine, trimethylpiperazine, 1,2,-peperidinoethane, bis(aminopropyl)piperazine, N-methyl-N'-(2-hydroxyethyl)piperazine, N-methyl-N'-(2-hydroxyethyl)piperazine, N-(N',N'-dimethylaminoethyl)morpholine, bis(morpholinoethyl)ether, bis (2,6-dimethylmorpholinoethyl)ether, 1,2-dimethylimidazole, N-methylimidazole, 1,4-diazine, diazabicyclo[2.2.2]-octane, 1,4-diazabicyclo[3.3.0]oct-4-ene, 1,5-diazabicyclo [4.3.0]non-5-ene, 1,8-diazabicyclo-[5.4.0]-undec-7-ene, phenolates thereof, octoates thereof, and the like; compounds having three tertiary nitrogen atoms including N,N,N',N",N"-pentamethyldiethylenetriamine, N,N,N',N",N"-pentamethyldipropylenetriamine, tetramethylguanidine, N-cyclohexyl-N',N',N",N"-tetramethylguanidine, N-methyl-N'-(2-dimethylamino)ethylpiperazine, 1,5,7-triazabicyclo[4.4.0] dec-5-ene, and the like; and compounds having four nitrogen atoms including 1,1,4,7,10,10-hexamethyltriethylenetetramine, 1,3,5-tris(N,N-dimethylpropyl)hexadro-1,3,5-triazine, and the like. Tin catalysts include by way of example, but not limitation, stannous octoate, dibutyltin diacetate, dibutyltin dilaurate, dibutyltin mercaptide, dibutyltin thiocarboxylate, dibutyltin dimaleate, dioctyltin mercaptide, dioctyltin thiocarboxylate, dibutyl tin oxide in diisooctyl phthalate, aliphatic organotin, and mixtures thereof. Lead, bismuth and mercury catalysts include by way of example but not limitation lead 2-ethylhexanate, bismuth neodecanoate, phenylmercury propionate, and the like.

In another embodiment the adhesive formulation includes modified silicone-containing adhesives, silicone-containing adhesives, polyurethane-containing adhesives, solvent-based adhesives, water-based adhesives, and mixtures of silicone and polyurethane and rubber containing adhesives.

In another embodiment of the invention, the moisture curable adhesive composition, reference number 1, includes, based on the total weight of the composition, from about 5% to about 95% by weight polymer having a reactive silicone end group, from about 0.01% to about 4% by weight catalyst, and from about 3% to about 35% diluent. Whereas conventional solvent-based adhesives take up to 20 to 30 minutes to achieve initial tack, the moisture curable adhesive has been surprisingly found to develop initial tack immediately or nearly immediately upon exposure to the air having a moisture content greater than about 20% relative humidity. The presence of a diluent improves flow, and the moisture curable adhesive of the present invention has a viscosity that preferably ranges from about 1,000 centipoise (cps) to about 500,000 cps and is advantageous for use in applications requiring high flowability.

Suitable diluents include, but are not limited to: polyglycols, for example, polypropylene glycol; mineral oils, such as white mineral oil and petroleum oil; vegetable oils, such as castor oil, corn oil, peanut oil; tall oil fatty acids, monofunctional polyether polymers; phthalate plasticisers, such as butyl benzyl phthalate, and diisodecyl phthalate; and mixtures thereof. Also, the moisture curable adhesive composition herein can optionally include a dehydrating agent, filler and an adhesion promoter.

It has been found that the presence of a diluent in low viscosity moisture curable adhesive formulations, that is, less than about 10,000 centipoise and preferably less than about 3,000 centipoise improves the flow of the moisture curable adhesive composition and also improves the tack. In this embodiment the moisture curable adhesive composition includes, based on the total weight of the composition, from about 5% to about 95%, preferably, from about 10% to about 90%, even more preferably, from about 20% to about 85% by weight polymer having a reactive silicone end group; from about 0.01% to about 4%, preferably from about 0.01% to about 3% by weight, more preferably from about 0.3% to about 3% by weight catalyst; and from about 3% to about 35%, preferably from about 7% to about 25%, more preferably from about 10% to about 18%, and even more preferably from about 12% to about 16% diluent. The moisture curable adhesive composition can be formulated to be self-leveling and is advantageous for use in applications requiring high flowability. "Self-leveling" means that the moisture curable adhesive composition once placed in contact to an adherend will readily flow on the surface of the adherend to achieve a substantially even thickness.

Depending on the packaging of the adhesive, the application for the adhesive, and the method of applying the adhesive, a wide range of viscosities may be necessary. Preferably the adhesive composition has a viscosity as measured by ASTM D1084-88 Test Method B from the container in which it is stored, of from about 1,000 to about 500,000 centipoise, more preferably from about 1,000 to about 300,000 centipoise, and more preferably from about 1,000 to about 200,000 centipoise.

In another embodiment of the invention, the moisture curable adhesive composition, reference number 1, includes, based on the total weight of the composition, from about 15% to about 95% by weight polymer having a reactive silicone end group, from about 0.01% to about 4% by weight catalyst, and from about 5% to about 90% filler. The type of polymer having a reactive silicone end group, the reactive silicone end group and the catalyst, all of which are described above, can be used. Whereas conventional adhesive compositions are typically limited by the amount of filler loading, the moisture curable adhesive herein has excellent physical properties, such as elongation, tack, and shear strength, over a broad range of filler loading. In addition, the moisture curable adhesive composition herein can optionally include from about 0.01% to about 5% by weight a dehydrating agent, pigments, and from about 0.01% to about 10% by weight adhesion promoter.

In yet another embodiment of the invention, the moisture curable adhesive composition, reference number 1, contains up to about 40% by weight filler, based on the total weight of the composition, to achieve an adhesive composition that is clear or substantially clear. Whereas fillers tend to cloud conventional adhesive compositions at relatively low filler loadings, it has been found, surprisingly, that a filler, such as, for example, a fumed silica which has a surface area that is less than about 250 $m^2$/gram can be used at substantially higher level loadings to achieve an adhesive composition that retains clarity.

In embodiments of the invention where any of the moisture curable adhesive compositions include fillers, relatively high levels of filler can be used to improve the strength of the adhesive composition while also maintaining the tack and viscosity characteristics of the adhesive. In one embodiment of the invention, the moisture curable adhesive composition includes, based on the total weight of the moisture curable adhesive composition: and from about 5% to about 95%, and preferably, from about 15% to about 85%, and more preferably from about 25% to about 75% by weight polymer having a reactive silicone end group; from about 0.01% to about 4%, preferably, from about 0.01% to about 3%, and more preferably from about 0.2% to about 2% by weight catalyst; and from about 5% to about 85%, preferably from about 10% to about 40%, and more preferably from about 15% to about 40% filler. Whereas conventional adhesive compositions are typically limited by the amount of filler loading, the moisture curable adhesive herein has excellent physical properties, including weathering and retention of clarity, shear strength to a range of surfaces, and initial tack for a broad range of filler loading.

A number of fillers can be used for the moisture curable adhesive composition. If a clear moisture curable adhesive is desired preferably a filler is used that will not substantially interfere with the clarity of the adhesive. By not substantially interfering with the clarity of the adhesive, it is meant that the adhesive with the filler appears to allow the transmission of visible light through it without substantial refraction or absorption of visible light. Preferably, the filler has an index of refraction that is within about 30% of that of the adhesive, more preferably that is within about 20% of that of the adhesive, even more preferably that is within 10% of that of the adhesive, and most preferably within 5% of that of the adhesive. Preferably, a 1 mm thick coating of the adhesive-filler mixture transmits greater than about 60% of the visible spectrum of sunlight, more preferably greater than about 75%, and most preferably greater than about 90%. Examples of clear fillers include but are not limited to fumed amorphous silica including hydrophylic and hydrophobic types, glass microbeads, glass fibers, clear polymer fibers, clear polymer microbeads, clear polymer powders, or combinations thereof. Preferably, the filler for a clear adhesive is a fumed amorphous silica including but not limited to for example hydrophylic fumed silicas and hydrophobic fumed silicas. Examples of these fumed silicas are sold by the Wacker HDK of Munich, Germany under the tradename S13, V15, V15A, N20, N20P for hydrophilic fumed silicas and H15, H15P, H20, H30, H18, H2000 for the hydrophobic fumed silicas. More preferably, the filler for a clear adhesive is a fumed silica sold under the tradename Aerosil OX-50 by Degussa Corporation of Ridgefield Park, N.J. Preferably, the clear adhesive comprises from about 0.01 to about 50 weight % of filler, more preferably from about 0.01 to about 40 weight % and most preferably from about 5 to about 20 weight %. Preferably, the individual clear filler particles have an average surface area of less than about 250 $m^2$/gram, more preferably less than about 150 $m^2$/gram and most preferably less than about 75 $m^2$/gram.

If a clear moisture curable adhesive is not necessary for the application of the adhesive, then a wider range of and greater amounts of fillers may be used. Examples of fillers include but are not limited to those listed above, zinc oxide; reinforcing, semi-reinforcing, and non-reinforcing carbon blacks; white carbon; expanded graphite powders; powdery graphite; crystalline silica; molten silica; silicates; chalk; calcium carbonate including limestone; talc; mica; alumina; aluminum hydroxide; zirconia; titanium dioxide; wollastonite; feldspar; aluminum silicate; solid and hollow ceramic microspheres hollow spheres, ceramic and plastic; metal powders and microbeads; wood flour; dolomite; organic or inorganic pigments, or combinations thereof. Preferably, the filler is calcium carbonate sold under the tradename Microwhite 100 by Imerys of Roswell, Ga. Preferably, the moisture curable adhesive comprises from about 5 to about 90 weight % of filler, more preferably from about 20 to about 85 weight %; even more preferably from about 35 to about 85 weight %; even more preferably from about 43 to about 85 weight %; and most preferably from about 60 to about 85 weight % of filler.

The moisture curable adhesive compositions can also include a dehydrating agent. Examples of dehydrating agents include but are not limited to vinyl trimethoxysilane, any vinyl alkoxysilane, inorganic and organic zeolites, and the like. A dehydrating agent is preferred to maintain a stable adhesive composition prior to reaction with moisture. Preferably, the dehydrating agent is vinyl trimethoxysilane sold under the tradename Silquest A-171 by Witco OSI Specialties of Danbury, Conn. Preferably, the adhesive comprises from about 0.01 to about 10% by weight of a dehydrating agent, more preferably from about 0.01 to about 5% by weight; and most preferably from about 0.01 to about 2% by weight of a dehydrating agent.

In addition to the above-described components, the moisture curable adhesive composition of the present invention can optionally include an additive or a combination of additives. Suitable additives include by way of example, but not limitation, anti-oxidants, catalysts, lubricants, extenders, biocides, adhesion promoters, UV absorbers and stabilizers. Some additives can operate to control the polymerization process, thereby affecting the physical properties (e.g., modulus, glass transition temperature) of the polymerization product formed from the composition.

The present invention is directed to a moisture curable adhesive composition, reference number 1, that includes, based on the total weight of the moisture curable adhesive composition from about 5% to about 98%, preferably from about 10% to about 90%, and more preferably, from about 20 to about 85%, and even more preferably, from about 25% to about 75% by weight polymer having a reactive silicone end group; and from about 0.01% to about 4%, preferably from about 0.01 to about 3%, and more preferably, from about 0.3% to about 2% by weight of a catalyst. The moisture curable adhesive composition of the present invention contains substantially all solids, typically less than about 3% volatile components, and has excellent physical properties. The adhesive composition reacts upon exposure to moisture and has little or no shrinkage upon curing as contrasted with conventional adhesive compositions which experience substantial shrinkage due to evaporation of volatiles.

In another embodiment, an adhesives kit contains up to six adhesive formulations to bond and includes: a cyanoacrylate adhesive formulation; an epoxy curing agent two component adhesive formulation that cures after the two components are activated by mixing together or heating; at least one additional adhesive formulation comprising a modified silicone-containing adhesive; and optionally at least one of a contact adhesive and a temporary removable adhesive.

Whereas conventional solvent-based adhesives take up to 20 to 30 minutes to achieve tack, surprisingly the moisture curable adhesive has been found to develop tack in less than about 20 minutes, preferably less than about 10 minutes, more preferably less than about one minute, and even more preferably immediately, or nearly immediately, upon exposure to the air having moisture content greater than about 20% relative humidity, preferably greater than about 25% relative humidity, and even more preferably less than about 30% relative humidity. Tack is herein defined according to ASTM D 907 as the property of an adhesive that enables it to form a bond of measurable strength immediately after adhesive and an adherend are brought into contact under low pressure. Tack can be measured by the Rolling Ball Tack Test according to ASTM D 3121.

The curable adhesive composition of reference number 2 in FIGS. 1-5 is the cyanoacrylate type adhesive. Suitable examples of cyanoacrylate glues or adhesives that are useful in the adhesive system of the present invention include curable cyanoacrylate adhesives as disclosed in the following U.S. Pat. Nos. 2,784,127; 3,260,637; 3,836,377; 4,460,759; 4,822,426; 4,979,993; 4,933,234; and 4,139,693, all of which are incorporated by reference. Suitable cyanoacrylate adhesives for use with the present invention are represented by the general formula:

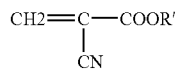

wherein R' is alkyl, alkenyl, cycloalkyl, aryl, alkoxalkyl, aralkyl, haloalkyl or other suitable group. These groups may have between 1 and 12 carbon atoms, preferably 1 to 4 carbon atoms. The lower alkyl alpha-cyanoacrylates are preferred. In particular, these include methyl, ethyl, n-propyl, n-butyl, isobutyl, isopropyl, allyl, cyclohexyl, methoxyethyl, methoxypropyl, cyclohexyl, n-pentyl, allyl, and ethoxyethyl cyanoacrylates. Other cyanide compounds with adhesive properties useful in the present invention are any of the commercially available cyanoacrylate esters adhesives. Many alpha-cyanoacrylates can be obtained commercially as one component instant adhesives, in which form they may be used in this invention. While these commercially available cyanoacrylates are composed principally of alpha-cyanoacrylate monomer, the formulation may contain stabilizers, thickeners, adhesion promoters, plasticizers, dyes, heat resistant additives, impact resistance modifiers, perfumes and such like. A diluted solution of a cyanoacrylate adhesive in a compatible solvent may also be used. It is known that monomeric forms of cyanoacrylates are extremely reactive, polymerizing rapidly in the presence of even minute amounts of an initiator. Monomers of alpha-cyanoacrylates are anionically polymerizable or free radical polymerizable, or polymerizable by zwitterions or ion pairs to form polymers. Once polymerization has been initiated, the cure rate can be very rapid. Suitable monomers that may be used in this invention are readily polymerizable, e.g. anionically polymerizable or free radical polymerizable, or polymerizable by zwitterions or ion pairs to form polymers. Such monomers include those that form polymers, that may, but do not need to, biodegrade.

Such monomers are disclosed in, for example, U.S. Pat. No. 5,328,687 to Leung, et al., which is hereby incorporated by reference.

Cyanoacrylate adhesives generally are rapid setting materials which have excellent utility in bonding a variety of adherents. The polymerization of cyanoacrylate adhesives is catalyzed using the accelerators, initiators, catalysts and/or hardeners. Such active components can be combined with the non-volatile fluid carrier to comprise the cyanoacrylate adhesive promoter composition. For example, the adhesive promoter component can be an amine or amino-bearing compound used to cure cyanoacrylate adhesive compositions. Other examples include organometallic compounds used as primers for anaerobic adhesive compositions. Also these can include cyanoacarylate adhesive using as accelerators amines dissolved in a volatile carrier solvent preferably having a boiling point below about 1000 C. For instance a hardening accelerator for use with cyanoacrylate adhesives are amine compound, with a boiling point of between 50. degree. C. and 250. degree. C., together with a deodorizer and a solvent. Examples of suitable amines are triethyl amine, diethyl amine, butyl amine, isopropyl amine, tributyl amine, N,N,-dimethyl aniline, N,N-diethyl aniline, N,N-dimethyl-p-toluidine, N,N-dimethyl-m-toluidine, N,N-dimethyl-o-toluidine, dimethyl benzyl amine, pyridine, picoline, vinyl pyridine, ethanolamine, propanolamine and ethylene diamine also quaternary ammonium salts can be used as adhesion promotors such as suitable compounds like alkyl ammonium salts, amide-bonded ammonium salts, ester-bonded ammonium salts, ether-bonded ammonium salts and alkylimidazolinium salts. Also compositions with monomeric ester of cyanoacetic acid and a polymerization accelerator applied by means of a volatile solvent can be used. Nonexclusive examples of these accelerators also include anionic materials such as hydroxyl- or amine-containing compounds such as those selected from a wide variety of materials which include: a) organic or inorganic substituted and unsubstituted amines such as primary, secondary and tertiary amines and their salts; b) N-substituted alkanoamines; c) acylated N-substituted alkanoamines; d) polyamines, such as diamines; e) heterocyclic amines such as the diazabicyclo or triazabicyclo compounds. Generally, the promoter component, i.e. active component, is present in the adhesive promoter composition in amounts which are effective to produce the required cure speed and tensile strength. The active component can be present in amounts of about 0.1% to about 10% by weight of the composition. Suitably, the activator component is present in the composition in amounts of about 0.5% to about 5.0% and more suitably, about 0.5% to about 1.0% by weight. A suitable cyanoacrylate adhesive is one based on ethyl cyanoacrylate or methyl cyanoacrylate or blends of both.

Additionally cyanoacrylate adhesives have incorporated a variety of additives directly into the adhesive composition to strengthen the bond. These additives have conventionally been directly incorporated into the adhesive composition rather than handling as a separate component, in contrast to typical accelerator and activator compositions. These additives include adhesion promoters such as those of 3,4,5-trihydroxybenzoic acid or esters thereof family of compounds. In addition to the adhesion promoter, an inhibitor is also added to the cyanoacrylate adhesive composition for ambient stability to stabilize the mixture from prematurely curing. Such an inhibitor can be any of those known to those skilled in the art.

The cyanoacrylate adhesive can be a two-part adhesive compositions, where a curable component is present in one part and a curing agent is present in a second part, the curing agent and/or accelerator is generally applied with vehicles such as lower alcohols and in some cases water. Also the cyanoacrylate adhesive compositions can be plasticized by the addition of compounds such as alkyl ester in aliphatic dicarboxylic acid or alkyl phosphates in which each alkyl group contains from 1 to 8 carbon atoms, as well as triaromatic phosphates such as triphenyl-phosphate and tricresyl-phosphate. These plasticizers are dissolved in the monomeric cyanoacrylate adhesive to retard failure of the adhesive bond after aging. Up to about 20% of the plasticizers are disclosed as being incorporated. The plasticizers allegedly function to add flexibility to the bond without adversely affecting the degree of adhesion.

Furthermore, the cyanoacrylate adhesive composition contained in an applicator can further include various additives as are known in the art, including but not limited to flavorants, preservatives, plasticizing agents, stabilizing agents, formaldehyde concentration reducing agents, pH modifiers, thickening agents, cross-linking agents, fibrous reinforcement agents, colorants, and the like. Suitable compositions, methods of making such compositions, and methods for incorporating such compositions into a dispenser device are described, for example, in U.S. Pat. No. 5,928,611 to Leung; U.S. Pat. Nos. 5,328,687, 5,514,371, 5,514,372, 5,575,997, 5,582,834 and 5,624,669, all to Leung et al; U.S. Pat. No. 5,259,835 to Clark et al.; U.S. Pat. No. 3,527,841 to Wicker et al.; U.S. Pat. No. 3,722,599 to Robertson et al.; U.S. Pat. No. 3,995,641 to Kronenthal et al.; and U.S. Pat. No. 3,940,362 to Overhults; all which are incorporated by reference.

The curable adhesive composition of the system of the present invention that is designated by reference number "3" in FIGS. 1-5 is at least an ambient curable one- or two-component epoxy-containing polymer adhesive. A suitable epoxy adhesive for use in the system of the present invention is any of those disclosed in U.S. Pat. No. 4,426,243 incorporated by reference. This adhesive is a polymerizable mixture comprising at least one polymerizable acrylic-based material, a polymerizable epoxide-based material and a bifunctional molecular material reactable with said acrylic-based material and said epoxide-based material. Generally the two part epoxy formulations have the epoxy resin and a hardener in separate packages or portions of a package for mixing just or immediately prior to use of the adhesive.

The one part and two part epoxy adhesives can have one or more epoxy resins with more than one epoxide group per molecule including saturated and unsaturated aliphatic, cycloaliphatic, and aromatic epoxy resins. Aromatic types of epoxy resins such as bisphenol A, bisphenol F and novolac epoxy resins are suitable for optimum bond strength at ambient and elevated temperature. Such epoxy resins can have a weight average molecular weight in the range of from 300 to 2,000. Examples of commercially available epoxy resins found useful for forming the adhesive include: Epon 834, Epon 828, Epon 862, Epon 1001, Eponex 1510 and Heloxy 107 that are commercially available from Shell Chemical of Houston, Tex.; Dow Chemical's DER 331, DEN 432, DEN 438 and DER 732; and CVC Specialty Chemical's Epalloy 8250, RF50 and Epalloy 8230 are also representative of the many epoxy resins that may be used in practice. The DER 331 and the EPON 828 are examples of epoxy resins with 2-ring epoxy compounds made by reacting bisphenol A with epichlorohydrin. Another epoxy resin that is available is one having a 2-ring structure such as N,N,N',N',-tetraglycidyl-4, 4'-methylene dianiline. This material is made by reacting an excess of epichlorohydrin with methylene dianiline. It is available commercially as MY-720 from Ciba Geigy Corp., Ardsley, N.Y. and consists of about 70% by weight of the above tetraglycidate, the remainder being oligomers and triglycidates.

A suitable amount by weight of an epoxy resin ingredient in an adhesive can be in the range of from 15 to 40 percent by weight based on the total weight of the adhesive composition. Using less than about 15 percent by weight of the epoxy resin ingredient may produce a finally-cured product that is lacks a desired degree of mechanical strength and chemical bond strength, and that may have a lower degree of chemical resistance to alkaline substances than that desired for particular applications. Using greater than about 40 percent by weight of the epoxy resin ingredient may produce a finally cured product that may be too brittle, has a low degree of chemical resistance to acidic reagents, or has a poor degree of chemical bond strength than that desired for particular applications. Also the epoxy resin can be a siloxane-modified epoxy that can be prepared by combining an epoxy resin with an organosilane ingredient and/or a polysiloxane resin. The siloxane-modified epoxy prepared using a polysiloxane resin provides the siloxane groups to form Si—O—Si bonds with an adherend.

Epoxy groups are reactive with amine, hydroxyl, and mercaptan functionalities and can thus be copolymerized (i.e. cured) with curing or hardener compounds containing such functionalities to make epoxy resin adhesive. Generally polyamines are favored as curing agents although polyhydroxy curing agents are also well known. The epoxy compounds can be reacted with one or more curing agents such that they are crosslinked, thereby finding use as structural adhesives. High temperature utility can be improved through the use of anhydrides and aromatic amine curing agents as well as through the use of epoxy resin obtained by the epoxidation, with peroxy compounds, of double bonds in certain Diels-Alder adducts.

Suitable non-limiting examples of the amine-containing hardner, include those selected from the group comprising aliphatic, cycloaliphatic or aromatic polyamines, polyamide or amidoamine hardeners and combinations thereof having at least two active amine hydrogens per molecule. The particular type of amine-containing hardener ingredient that is selected may depend on the final adhesive/adherend applications. For example, the use of aliphatic polyamines are desired where rapid attainment of bond strength is needed, the use of cycloaliphatic polyanlines are desired when long pot life is required, the use of aromatic polyamines are desired in those applications where a high degree of chemical resistance is needed, and the use of amidoamine or polyamide hardeners are desired in those applications where some flexibility of the adhesive or adhesive/adherend joint is required. The use of the amine-containing hardener ingredient can be desirable because it helps to control the cross-linking of the epoxy resin ingredient. Some of the polyamine hardeners are "Fast Hardeners" useful where quick curing is necessary or for use in lower temperatures. "Fast Hardener" is also useful where a clear, natural finished surface is desired. The "Slow Hardener" is used where longer working or pot life is desirable. It should not be used below 65° F. and warmer temperatures are preferable. A slow hardener generally cures tack free in 20-24 hrs., with full cure in 13 days. Also the hardeners can be mixed together. Such a mixing of the different types of hardeners allows for a range of cure times or pot life for any given condition or application. Suitable amine-containing hardener can have a weight average molecular weight in the range of from about 60 to 600.

A suitable epoxy adhesive can be prepared by using in the range of from about 1 to 25 percent by weight of the amine-containing hardener ingredient based on the total weight of the adhesive composition. Using less than about one percent by weight of the amine-containing hardener ingredient can produce an adhesive composition having an insufficient degree of amine functionality to cross link or cure the epoxy resin ingredient. Using greater than about 25 percent by weight of the amine-containing hardener ingredient it may produce an adhesive composition having excess or unreacted amine, which can reduce the overall chemical bond strength and chemical resistance of the finally-cured product. For the fast hardener or slow hardener either hardener or mixture can be mixed in a ratio of at a 5:1 ratio (5 parts resin to 1 part hardener by volume or weight). Pot life with "Fast Hardener" is about 10 minutes at 70° F., tack-free at about 3 to 4 hours at 70° F. Pot life with "Slow Hardener" is about 25 to 35 minutes at 70° F., tack free at about 5 to 6 hours at 70° F. Also it is possible that the epoxy resin ingredient and the hardener are both "100% solids"; that is, all the constituents contribute to the curing process and physical properties of the final product. With such a solids level no thinners, solvents, or diluents need be added for any application. A suitable epoxy adhesive with additives is an epoxy adhesive based on a component composed of a resin which may be bisphenol A based, but can be based on other epoxy resins and blends of epoxy resins, and a second component composed of one or more of the following: mercaptan terminated polymers, amine-containing hardeners and accelerators, and/ or blends of these raw materials in ratios suitable to react with the epoxy resin component when mixed and result in a product in a cured, solid form.

Other additives may be present in the epoxy adhesive such as organometallic catalyst, including metal driers well known in the paint industry, e.g., zinc, manganese, cobalt, iron, lead and tin octoate, neodecanates and napthenates. Organotitanates such as butyl titanate like those mentioned above for the silicone containing adhesive can also be used. Use of the organometallic catalyst catalyzes hydrolysis and condensation of the organosilane and polysiloxane resin part of the epoxy resin and, thereby help promote ambient temperature curing within a reasonable time. In one embodiment, the adhesive is prepared by using in the range of from about 0.1 to 5 percent by weight of the organometallic catalyst based on the total weight of the adhesive composition. Using less than about 0.1 percent by weight of the organometallic catalyst can produce an adhesive composition having a long cure time that may not be suitable for particular applications. Using greater than about five percent by weight of the organometallic catalyst can produce a finally-cured product having lowered properties of mechanical strength, chemical bond strength and chemical resistance due to its presence in excess. In a particularly preferred embodiment, approximately 0.4 percent by weight of the organometallic catalyst is used to prepare the adhesive component. Another additive for the epoxy adhesive can be other resins such phenolic, polyester, vinyl ester, polyurethane, polyamide, melamine, furan, acrylate, thermoplastic polyvinyl chloride, polyethylene, polycarbonate, ABS, polystyrene, ethylene vinyl acetate, polyvinyl acetate, polyamide, and polypropylene resins.

Reference is now made to the drawings, wherein similar parts or elements of the drawings are indicated by the same reference number in all of the drawings. Generally the adhesives indicated in the FIGS. 1-5 with a reference number can be indicated by any symbol such as letters of any language's alphabet or numbering system or any geometric pattern. Also the reference numbers themselves can be different or re-ordered from those of the drawings. For example, the "1" could be for cyanoacrylate and the "2" could be for epoxy and the "3" could be for silane-or silicone-containing and the like as long as the numbers in the charts of the figures are changed in a similar fashion and the product adhesives also are changed accordingly.

As shown in FIG. 1, the "y" axis denoted as Reference 11 has for each row of the matrix chart a specific substrate or adherend listed. The list along the y axis has a specific order. One such order can be from the top of the matrix for the first row: Leather/Vinyl at reference number 12, for the second row Styrofoam Material, 13; for the third row Paper, 14; for the fourth row Glass, 15; for the fifth row Fabric, 16; for the sixth row Rubber, 17; for the seventh row Plastic, 18; for the eighth row Ceramic, 19; for the ninth row Metal, 20; for the tenth row Wood, 21; and for the eleventh row Masonry 22. For the "x" axis indicated as Reference 23, the same substrates or adherends are arranged in the same order as for the vertical rows indicated by reference numbers 24 through 34. The matrix chart can be developed to accommodate any number of adherends; for instance, from as small a number as two or three up to a number of 15 or more in the rows and columns.

The boxes of FIG. 1 are filled with a number corresponding to a particular adhesive of the system. For the box which is reference number 35, a 1 appears indicating the first adhesive of the system. For box reference number 36, a number 2 appears indicating the second adhesive of a three adhesive system. In box reference number 37, the number 3 appears indicating the third adhesive of the adhesive system. Of course, the boxes could have any type of nomenclature for the adhesives of the system; they could be numbers, letters, or any other alpha-numeric symbol or other symbol for other languages or numbers or letters of other languages or any symbol to designate the specific adhesives of the system.

The matrix chart of FIG. 1 can accommodate a system of up to six adhesives for the kit. Generally the chart of FIG. 1 would be arranged in the same way with the types of substrates that preferably would be arranged on the axes in a similar manner. The symbols for the types of adhesives in the system would range from 1 to 6 instead of from 1 to 3. Depending on the types of optional additional adhesives some of the numbers i.e., "1", "2", or "3" would change to "4", "5", or "6" in the matrix chart. Generally this change is based on which adhesive is better at adhering the particular substrates together.

In a similar manner to FIG. 1, FIGS. 2 through 5 have a similar arrangement of the listing of the adherends but the arrangement of the adhesives numbered in the boxes, 35, 36 and 37, depend upon the usefulness of that adhesive with the particular adherend at the intersection of the vertical row and the horizontal row for the particular condition for each matrix chart of the Figure. For instance, for FIG. 2, the condition for which adhesive of the system will be best for the adherend indicated at the intersection of the horizontal row and the vertical row is whether the bond of the adhesive to the adherend will be exposed to extremes in temperature. Such extremes in temperature for FIG. 2 are less than 40° F. or greater than 90° F. If the answer to this condition is yes, then the FIG. 2 matrix chart is used to determine the adhesive of the system.

For FIG. 2 if the response to the question of if the condition will exist is no, then the next Figure, FIG. 3, might be used depending on the condition. FIG. 3 can be the matrix chart based on the condition of whether the bond is in an exterior exposure or on the size of the surface area to be bonded. If the answer is yes, then the matrix of FIG. 3 determines for that condition which adhesive 1 through 3 is used for bonding the particular adherend arranged on the x and y axes where the row and column intersect on the matrix chart. If the response to the condition for FIG. 3 is no, then the next Figure, FIG. 4 is considered. FIG. 4 can be for the condition of whether the repair will be load bearing. If yes, then FIG. 4 is used to determine which adhesive, 1 through 3, is recommended for the bonding of the particular substrates preferably arranged in the same order along the x and y axes. If the response to the condition is no, then the next Figure, FIG. 5, is considered. FIG. 5 can be for the condition of all negative responses to the foregoing conditions for FIGS. 2 through and including 4, then the FIG. 5 is used.

Of course, FIGS. 2 through 4 can have any arrangement for the condition for which chart or figure and/or additional charts can be added for additional conditions. The arrangement and number of conditions need not be as set forth in actual FIGS. 2 through 4, but could be the reverse order of the conditions or some other order. Also it is preferable but not mandatory to have the of each matrix. Of course, the last Figure, FIG. 5, would always be the same. Also, additional Figures can be used or additional matrices can be used where the system has more than three adhesives.

Also when one or more of the optional adhesives are included in the basic three adhesive system, the matrix charts of FIGS. 2 through and including 4 can be supplemented. Such supplemental matrices would be in a similar manner to the matrix charts of FIGS. 2 through 4 for more than three and up to 6 adhesives for the system. This supplemental matrix or matrices would be for responses to the conditions for each of the separate matrix charts of FIGS. 2 through and including 4 including as supplemental the performance of each additional adhesive of the system. So again, as for FIG. 1, some of the "1"'s, "2"'s, and "3"'s, of the chart may become "4"'s, "5"'s, or "6"'s depending on the number of adhesives in the system and the responses for their use for the particular condition of each matrix chart for the various substrates. Again the matrix chart of FIG. 5 would also be changed to accommodate the additional optional adhesives like for FIGS. 2-4 and again FIG. 5 would be for the condition when all the other conditions of the matrix charts of FIGS. 2-4 are in the negative. Also additional matrix charts can be added between charts of FIGS. 4 and 5 for additional conditions.

Figure 6:
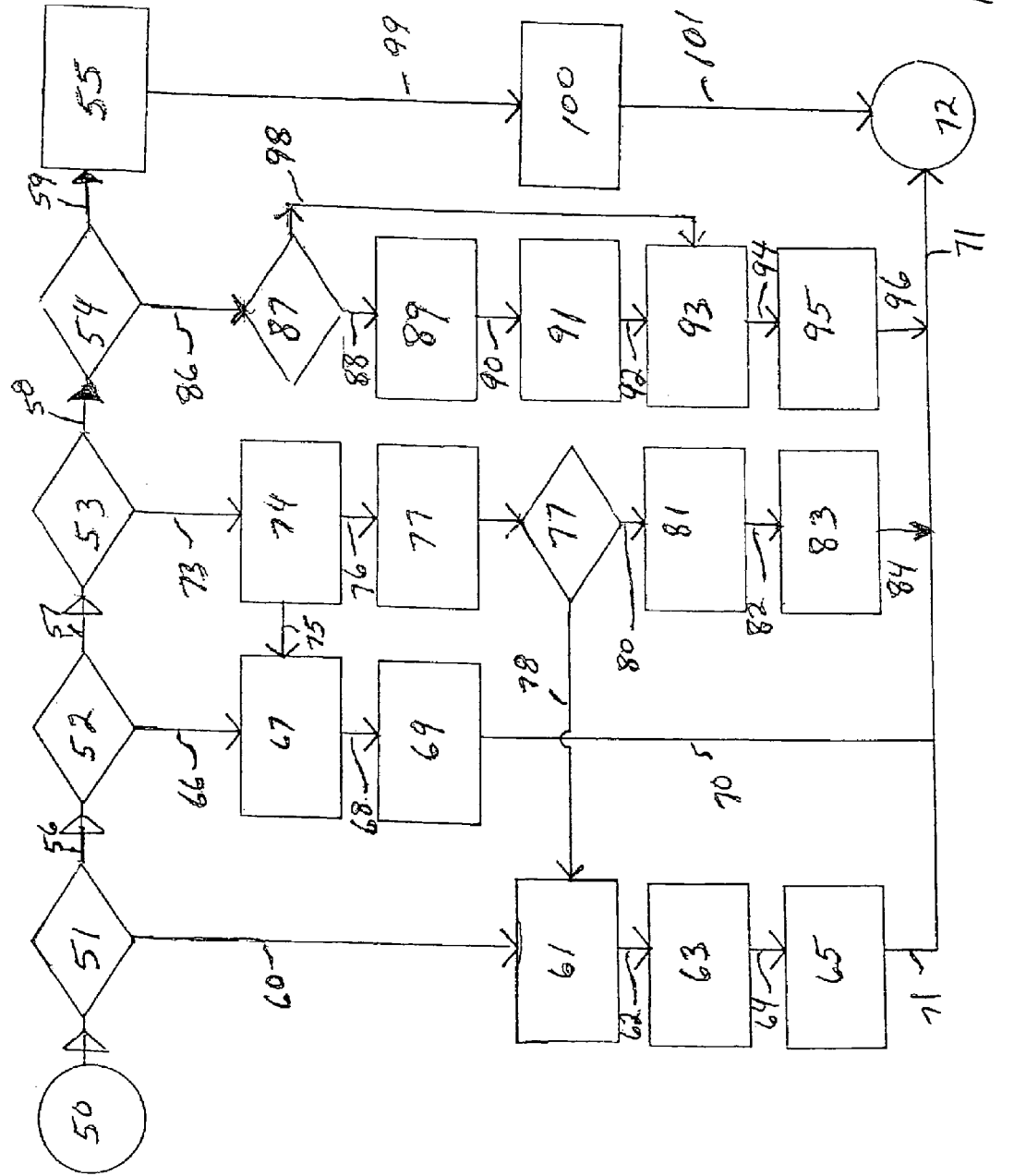
FIG. 6 is a flow chart of how to use the adhesives in the system for a particular type of adhesive use.

In FIG. 6, a How-To-Glue-It-Flowchart indicates how to apply the more than 2 but less than 6 adhesives of the adhesive system to particular types of gluing repairs. At Reference 50, one starts by determining the type of project or repair. The flow of the flowchart of FIG. 6 is to try and stay as far left on the flowchart as you can. In regards to the type or what the repair looks like, does it look like reference 51, patching a hole, or reference 52, one flat surface over another like a lap joint or reference 53, sealing a tear, or reference 54, gluing two pieces end-to-end as in a butt joint. If the answer is no for reference number 51, patching a hole, move horizontally across the reference numbers 52, 53 and 54 until you get a yes. If you still get a no at reference number 54 for gluing two pieces end-to-end, then one goes to reference number 55 which is to follow basic instructions for gluing. The movement horizontally from reference number 51 through and to reference number 55 is indicated by a no response for movement reference number 56, 57, 58 and 59. If one obtains a yes indication for patching a hole, one proceeds by reference number 60 to reference number 61 which is make a patch piece. It should overlap the hole by at least half again the distance from the center to the edge. Then one proceeds by reference number 62 to reference number 63 which is lay a bead of glue around the hole, centered in the area that the overlap from the patch will occur. Next, one moves by reference number 64 to reference number 65 which is press a patch in place firmly, but not so hard as to squeeze out most of the glue. Make sure the entire bead around the hole has been pressed.

If the answer to what type of repair is it and it's not patching a hole, 51, but it is a lap joint repair, 52, one moves by reference number 66 to reference number 67. This shows that for a type of lap joint, one applies a dab or bead of adhesive on the smaller surface (if practical). Apply enough so the adhesive will spread to cover most of the surface when pressed in place, or trowel adhesive over the entire surface using the applicator tip or similar spreading tool over the adhesive. After this, one moves to the next instruction by movement reference number 68 to reference number 69. This instruction is press surfaces together and smooth any adhesive that squeezes out of the joint. Brace, clamp, or immobilize as necessary. Then one proceeds by reference number 70 as is the case for the patching of a hole one proceeds by reference number 71 to reference number 72 to allow the repair to dry overnight then use as normal.

If the response to what type of repair is it is "no" for patching a hole, 51, and "no" for a lap joint, 52, but "yes" for sealing a tear, 53, one proceeds by reference number 73 to instruction 74 which is if size of tear can be overlapped by a quarter inch (0.25 inch) or more without pulling apart by itself, treat this as a lap joint. Then one proceeds by reference number 75 back to the instruction for reference number 67 and follows that flow of instructions through to allowing the adhesive to dry with the repair overnight at reference number 72. If the sides of the tear cannot be overlapped by a quarter inch or more, one proceeds by reference number 76 to instruction reference number 77 which is if a piece of suitable material is available to use as a patch, treat as patching a hole. Then one proceeds by reference number 78 back to the course of action with instruction reference number 61 of making a patch piece then following that set of instructions through to reference number 72 allowing the adhesive and repair to dry overnight. If another piece of suitable material is not available, one follows reference number 80 to instruction reference number 81 with the end lying as close together as possible, lay a bead over the entire tear and a little past each end. One next goes by reference number 82 to Instruction 83 which is using the applicator tip or similar trowel edge or tool, smooth the bead so that it forms a thin film on both sides of the tear extending into good material and filling the void of the tear. One then follows reference number 84 to reference number 72 to the action of allowing the adhesive and repair to dry overnight then use as normal as reference number 72.

If the answer to the type of tear at reference number 53 is "no" but is "yes" for reference number 54, gluing a butt joint, one moves by reference number 86 to the course of Instruction 87 of will the repair piece have to support any load? If the answer is yes, one proceeds by reference number 88 to the Instruction of 89 of finding a suitable piece to use as a splint to reinforce the repair joint. One next moves as indicated by reference number 90 to Instruction 91 which is apply adhesive to the splint over all the area that will be in contact with the repaired piece. Next one moves as indicated by reference number 92 to the Instruction 93 of applying adhesive to both ends of the joint but if the adhesive is a quick set cyanoacrylate type of adhesive, apply to only one end. Next, one moves as indicated by reference number 94 to the Instruction 95 which is join all pieces together as desired and brace, clamp, or immobilize entire assembly. Afterwards, one takes or follows the course of action as indicated by reference number 96 moving to reference number 71 and course of action 72 which is allow to dry overnight then use as normal. If the answer at reference number 87 a "no" to will the repair piece have to support any load at all, one moves as indicated by reference number 98 to reference number 93 instruction of apply adhesive to both ends of joint. However, if the adhesive is an cyanoacrylate quick setting adhesive, it is applied to only one end. If the answer to the type of repair question at reference number 54 whether the repair is a butt joint is no, one moves to reference number 55 which would be general instructions for any type of gluing. This would be that parts to be glued should be clean and dry and the parts should mate. They may have to be cleaned with a solvent or sprayed. The adhesive is gently squeezed out a drop of adhesive on each side of the part to be repaired. Apply one drop per square inch. The joint parts are then pressed for 10 seconds or until the adhesive sets or 18 minutes as indicated by reference number 100 which flows from reference number 55 by reference number 99. After such pressing time has expired as indicated by reference number 101, one moves to reference number 72 which is allow to dry overnight then use as normal.

Another embodiment of matching process can be suitable for the present invention rather than the matching of the type of adhesive of the system of the present invention for the type or types of adherends as depicted in FIG. 1 or FIGS. 2 through and including 5. Even though the matrix chart matching process of FIG. 1 may be ideal for appearance on product packaging other processes can be used in lieu of such a chart on packaging or in addition to the chart. This alternative embodiment can be fashioned into a computer program and presented on a computer system, even including a web page on the Internet. Such a system for matching surfaces could be interactive on the Internet using any programming language known to those skilled in the art for placing web pages that are interactive on the Internet. The program would allow the user to choose two materials which could be the same or different from a list which would be similar to the lists of substrates in FIG. 1 on the abscissa (x-axis) or ordinate (y-axis) of the matrix chart. Then the question of FIG. 2 would be asked of the user visiting the web site concerning the temperature of the glue repair whether it would be normal or extreme. Another query would be asked of the user as to whether the repair would be exposed to rain or water or direct sunlight. Again, the user would have a chance to respond to this query by a yes or no response. Next, a query would be asked of the user regarding the surface area to be glued to the materials. In some fashion, this query could elicit from the user a simple yes/no response or an indication of the size of the repair in regards to surface area. For example, the question can be asked whether the area to be bonded is larger than a quarter or U.S. currency. An additional query that the user could answer is whether the repair must endure weight or other stress. Again, the query can be asked in another fashion as to the degree of weight or stress the repair must endure. For eliciting a simple yes/no response from the user, the query can be fashioned whether the repair needs to endure any weight or stress. Upon the user entering a response to this query, a selection of the adhesive that is useful for the end user's particular use can be given.

Additional features that could be included in the program to run on the web site could be keeping a profile of the questions and responses of the user as the user responds to the various queries. Also at the end, the profile can list the selected adhesive of the system. In addition, the web site with this interactive selection system or process or facility for selecting the adhesive of the system can include other functionality. For instance, without limiting the invention, the instructions for use of the recommended adhesive can be accessed at the web site. Also, application tips on use of the recommended adhesive can be included. Another example of additional functionality could include project tips for use of the various adhesives of the systems. Furthermore, frequently asked questions can be included as another functionality. An additional functionality could be a how to glue guide or tips and tricks on utilization of the glues of the system; for instance, like that described for FIG. 6.

For instance, on the tips and tricks, the interactive program on the web site could ask a number of queries of the user. The end user would give responses at the web site which would lead to a selection of the way to glue the two materials or substrates or adherends similarly to the process where the adhesive was selected from the other query directed program. This could be done with any suitable programming language known to those skilled in the art. For instance, one query can be asking the user what type of repair needs to be made selected from those such as mending a tear, gluing a flat surface, patching a hole or gluing end to end like a butt joint. In the selection of mending a tear, additional queries can be asked of the end user for a response to direct the end user for use information of the adhesive related to the particular repair task of the end user. For instance, in the patching a hole selection, the end user could be asked whether the end user has additional fabric and if so, the instruction could be how to glue the additional fabric to cover the hole. If the end user does not have additional fabric, a query could be asked whether the size the tear could be overlapped. For gluing two pieces end to end, an additional query can be asked of whether the glued repair would have to bear weight. Upon the response of the end user, the instructions for that type of repair are displayed on the web site. In essence this is similar to making the flow diagram of FIG. 6 into an interactive computer program for a web site.

For the interactive web site with the protocol for selecting an adhesive from the kit with the system for the type of adherends to be bonded especially with the protocol for the type of repair to be made provides an overall adhesive system to maximize the success of the end user in selecting the adhesive for the system and achieving a desired outcome. Of course such a system could also be arranged for an automated or non-automated telephone answering system.

An example of such a web page to receive a solicitation for an adhesive recommendation by end user of an adhesive product from a computer used by the end user is the Perfect Glue adhesive web page at www.perfectglue.com, hereby incorporated by reference. In general the sequence of solicitation for a recommendation of an adhesive of the system of the present invention, the processing of the solicitation; the formulating of the recommendation, the selecting of a recommended adhesive based on the processing; and providing the recommendation back to the client computer can involve the algorithm used in the process described in FIGS. 2 through and including 5 or as discussed above for such an internet web page.

The architecture of a system environment for implementing the principles of such an internet process may include components of an internet system implemented through any suitable combinations of hardware, software, and/or firmware known to those skilled in the art. For example such a system can include a plurality of client computers and network, server computer, administrative server and database. It can be appreciated that any number of client computers may reside on a network. Client computers may access server via a network through an associated Internet Service Provider. While the network may preferably be implemented as the Internet, the network may be any local or wide area network, either public or private or any automated telephone system.

WORKING EXAMPLES

Examples 1-3

In Examples 1-3, moisture-curable adhesive compositions, listed in Table 1 below, were generally prepared by the following procedure: a translucent, low viscosity adhesive was made by mixing a polypropylene oxide with a methyldimethoxysilyl functional group sold under the trade name MS Polymer S303H by Kaneka of Osaka, Japan in a low speed Sigma Blade Lab Mixer from Teledyne Readco of York, Pa. keeping the mixer covered to minimize moisture exposure. The mixer was started on a low speed and the following materials were added: one of three polypropylene glycols sold under the tradename Arcol Polyol PPG-2000, PPG-3025 and PPG-4000 by Bayer of Pittsburgh, Pa., and a sterically hindered phenolic anti-oxidant sold under the tradename Irganox 1010 by Ciba Specialty Chemicals of Tarrytown, N.Y. The mixer was then sealed and heated to between 71° C.-77° C. While heating, a vacuum was applied to the batch in the mixer to continuously distill off any water in the raw materials.

The mixture was tested for water content after mixing at the target temperature to determine if the target level of less than 1000 ppm was obtained. Heating and vacuum were continued until the moisture content was below 1000 ppm. Once this level was attained, the heat was shut off and the vacuum broken.

When the batch had cooled to below 50° C., a vinyl trimethoxysilane dehydrating agent sold under the tradename Silquest A-171 Silane by Witco OSI Specialties of Danbury, Conn. was added to the mixture and mixed at low speed for five minutes. Afterwards, N-(3-trimethoxy-1,2-ethanediamine) silane adhesion promoter sold under the tradename Silquest A-1120 by Witco OSI Specialties of Danbury, Conn. was added to the mixture and mixed at low speed for 5 minutes. Afterwards, dibutyl tin oxide in diisooctyl phthalate catalyst sold under the tradename FomRez SUL-11A by Witco OSI Specialties of Danbury, Conn. was added to the mixture, a vacuum was drawn, and the mixture was mixed at low speed for five minutes. The mixture was then transferred to an air-tight container for further testing.

TABLE 1

| Raw Material | Ex. 1 (wt %) | Ex. 2 (wt %) | Ex. 3 (wt %) |
| --- | --- | --- | --- |
| Kaneka S303 H Polymer | 623 (74.264) | 638.6 | 613 (74.3) |
| Kaneka MAX 601 Polymer | 0 | 0 | 0 |
| Arcol PPG-2000 Diluent | 166 (19.788) | 0.9 | 0 |
| Arcol PPG-3025 Diluent | 0 | 105.5 | 0 |
| Arcol P-4000 Diluent | 0 | 0.9 | 163.0 |
| Santicizer 100 Plasticizer | 0 | 60 | 0 |
| Tinuvin 327 Antioixdant | 0 | 0.9 | 0 |
| Tinuvin 770 Light Stabilizer | 0 | 0.9 | 0 |
| Aerosil R972 | 0 | 60 | 0 |
| Irganox 1010 Antioxidant | 6.2 (7.39) | 0.9 | 6.0 |
| Silquest A-171 Silane (Dehydrating Agent) | 12.5 (1.490) | 14.7 | 12.3 (1.5) |
| Silquest A-1120 Silane (Adhesion Promoter) | 18.7 (2.229) | 21.3 | 18.4 (2.2) |
| FomRez SUL-11A Catalyst | 12.5 (1.490) | 14.7 | 12.3 (1.5) |

Shear Strength

ASTM D 1002 (Modified) Note: The modification consists of using surfaces other than metal. All other parameters remain the same.

The viscosity of the composition of Example 1 (Brookfield Viscometer, T/B Spindle, 5 rpm at 23° C.): 2400 cps. The adhesive of the composition from Example 1 was spread on one layer of canvas adherend and immediately covered with a second canvas adherend and the peel strengths were measured. The peel strengths of the five test samples were 4.7, 4.4, 4.5, 4.3, and 4.7 pounds per lineal inch (pli) with an average peel strength of 4.5 pli plus or minus 0.25 pli.

The adhesive composition of Example 1 was applied between formica and plywood adherends. The moisture curable adhesive composition was troweled on one surface only (⅛"×⅛") and then tested for adhesion. The formica/plywood assembly was placed in an oven and heated to 105° C. for approximately 3 hours. No edge lifting was observed.

The composition of Example 2 was tested for shear strength on wood. According to ASTM D 1002, the shear strength was as follows: 147.6 psi after 24 hours from application, 198.5 psi after 48 hours, and 175.2 psi after 1 week.

The hardness of the adhesive composition of Example 2 was also tested. The Shore A Hardness was 32A after 24 hours from application, and was 37A after 48 hours.

| Shore A Hardness | |
| --- | --- |
| 24 hrs. | 32 |
| 48 hrs. | 37 |

The shear strength of the composition of Example 2 was tested on wood after 24 hrs, 48 hrs and 1 week. The results were as follows:

| Shear Strength (Wood): | |
| --- | --- |
| 24 hrs. | 147.6 psi |
| 48 hrs. | 198.5 psi |
| 1 week | 175.2 psi |

Examples 4-11

In Examples 4-11, moisture-curable adhesive compositions, listed in Table 2 below, were generally prepared by the following procedure: a clear adhesive was made by mixing polypropyleneoxide with a methyldimethoxysilyl functional group sold under the tradename MS Polymer S303H by Kaneka of Osaka, Japan in a low speed Sigma Blade Lab Mixer from Teledyne Readco of York, Pa. keeping the mixer covered to minimize moisture pickup. The Sigma Blade Lab Mixer was started on a low speed and the following were added: fumed amorphous silica filler with a surface area of 50 m²/gram sold under the tradename Aerosil OX-50 by Degussa Corporation of Ridgefield Park, N.J.; a substituted benzotriazole anti-oxidant sold under the tradename of Tinuvin 327 by Ciba Specialty Chemicals of Tarrytown, N.Y.; a hindered amine light stabilizer anti-oxidant sold under the tradename of Tinuvin 770 by Ciba Specialty Chemicals of Tarrytown, N.Y.; and a sterically hindered phenolic anti-oxidant sold under the tradename Irganox 1010 by Ciba Specialty Chemicals of Tarrytown, N.Y.

The mixer was then sealed and heated to between 71° C.-77° C. While heating, a vacuum was pulled on the mixer to continuously distill off any water in the mixture. The mixture was tested after reaching the target temperature to determine whether the target moisture level of less than 1000 ppm was obtained. The heating and vacuum were continued until this target was achieved. Once attained, the heat was shut off and the vacuum broken.

Once the batch had cooled to less than 50° C., then a vinyl trimethoxysilane dehydrating agent sold under the tradename Silquest A-171 Silane by Witco OSI Specialties of Danbury, Conn. was added to the mixture and mixed at low speed for 5 minutes. Afterwards, N-(3-trimethoxy-1,2-ethanediamine) silane adhesion promoter sold under the tradename Silquest A-1120 by Witco OSI Specialties of Danbury, Conn. was added to the mixture and mixed at low speed for 5 minutes. Afterward, dibutyl tin oxide in diisooctyl phthalate catalyst sold under the tradename FomRez SUL-11A by Witco OSI Specialties of Danbury, Conn. was added to the mixture, a vacuum was drawn and the mixture was mixed at low speed for 5 minutes. The mixture was then transferred to air-tight containers for further testing.

The shear strength of the composition of Example 5 containing 21.8% by weight of fumed silica filler was tested for shear strength after a 24 hour cure and after a 1 week cure on several different substrates. The results were as follows:

| Time | ABS | Polystyrene | PVC | Wood | Aluminum |
|---|---|---|---|---|---|
| 24 hours. | 75.5 | 115.6 | 120.0 | 248.9 | 127.3 |
| 1 week | 92.8 | 127.2 | 143.4 | 274.0 | 138.6 |

The composition of Example 9 was also tested for Q-UV. The composition of Example 9 containing 14.7% fumed silica having a surface area of about 90 meters squared per grams performed as follows:

| | |
|---|---|
| 100 hours: | No yellowing |
| 150 hours: | Slight yellowing |
| 938 hours: | Moderate yellowing |

TABLE 2

| Raw Material | Ex. 4 (wt %) | Ex. 5 (wt %) | Ex. 6 (wt %) | Ex. 7 (wt %) | Ex. 8 (wt %) | Ex. 9 (wt %) | Ex. 10 | Ex. 11 |
|---|---|---|---|---|---|---|---|---|
| Kaneka S303 H Polymer | 626 (67.2) | 626 (67.2) | 0 | 0 | 760 (84.9) | 584 | 725.7 | 725.7 |
| Kaneka MAX 601 Polymer | 0 | 0 | 760 (76.3) | 689 (70.3) | 0 | 0 | 0 | 0 |
| OX-50 Fumed Silica | 243 (26.1) | 203 (21.8) | 150 (15.1) | 204 (20.8) | 0 | 0 | 30.0 | 10.0 |
| Aerosil R 972 Fumed Silica | 0 | 40 (4.29) | 15 (1.51) | 13.6 (1.39) | 63.4 (7.08) | 0 | 30.0 | 50.0 |
| Aerosil 90 Fumed Silica | 0 | 0 | 0 | 0 | 0 | 110 (14.7) | 0 | 0 |
| Tinuvin 327 Antioixdant | 6.3 (.68) | 6.3 (.68) | 6 (.60) | 5.4 (.55) | 6.3 (.68) | 1.7 | 0.9 | 0.9 |
| Tinuvin P Light Stabilizer | 6.3 (.68) | 6.3 (.68) | 0 | 0 | 0 | 0 | 0 | 0 |
| Tinuvin 770 Light Stabilizer | 6.3 (.68) | 6.3 (.68) | 6 (.60) | 5.4 | 6.3 | 1.7 | 0.9 | 0.9 |
| Irganox 1010 Antioxidant | 6.3 (.68) | 6.3 (.68) | 6 | 5.4 | 6.3 | 1.7 | 0.9 | 0.9 |
| Silquest A-171 Silane | 12.5 (1.34) | 12.5 (1.34) | 15.2 | 13.8 (1.41) | 15.2 | 14.4 | 14.7 | 14.7 |
| Silquest A-1120 Silane | 18.8 (2.02) | 18.8 (2.02) | 0 | 0 | 22.8 (2.55) | 21.2 | 0 | 0 |
| Silquest A-2120 Silane | 0 | 0 | 22.8 (2.29) | 29 (2.96) | 0 | 0 | 0 | 0 |
| FomRez SUL-11A Catalyst | 12.5 (1.34) | 12.5 (1.34) | 15.2 | 13.8 | 15.2 (1.70) | 2.8 | 14.7 | 14.7 |
| Neostann U-220 Catalyst | 0 | 0 | 0 | 0 | 0 | 10 | 0 | 0 |

*All weights in grams

The shear strength of the moisture curable adhesive composition of Example 4 was tested according to ASTM D 1002 and the results are as follows:

| Time | Wood | Polystyrene | PVC | ABS |
|---|---|---|---|---|
| 24 hours. | 284.7 | 113.9 | 94.0 | 99.5 |
| 1 week | 286.3 | 159.3 | 145.6 | 115.6 |

The moisture curable adhesive composition of Example 4 containing 27.5% by weight fumed silica (OX-50) was placed in a Q-UV Weatherometer: After 1,687 hrs, the adhesive composition showed only slight yellowing and cracking.

The shear strength of the composition of Example 9 was also measured on wood samples and the results are as follows:

| | |
|---|---|
| 24 hours: | 255.0 psi, 50% wood failure |
| 48 hours: | 273.0 psi, 100% wood failure |
| 1 week: | 274.1 psi, 100% wood failure |

UV Weathering:

An adhesive composition of Example 10 containing 3.7% by weight of fumed silica and one from the composition of Example 11 containing 1.2% by weight of fumed silica were tested for weathering. These compositions were cast on aluminum and were allowed to cure for 24 hours at room temperature. The samples were then placed in the Q-UV Weatherometer. After 100 hours of UV exposure, it was noted that the composition of Example 10 having relatively less fumed silica, had started to yellow. In the composition of Example 11, there was slight yellowing after 100 hours of UV exposure. However, the results of the composition of Example 11 experienced slight yellowing after 160 hours in the weatherometer.

Samples from Examples 4-8 and 13 were tested for viscosity following the procedure established under ASTM D 1084-88 Test Method B to measure the viscosity of the mixture initially and 24 hours later and the measurements are listed below:

| Viscosity Initial (centipoise) | Viscosity 24 hours later (centipoise) |
|---|---|
| 4,000 | 48,000 |
| 72,000 | 464,000 |
| 16,000 | 200,000 |
| 48,000 | 784,000 |
| 128,000 | 200,000 |
| 80,000 | 250,000 |

The testing showed that the viscosity using a fumed amorphous silica was dependent on the surface area of the silica particles used. The viscosity of samples from Examples 2 and 4 were in an unusable range when measured at 24 hours. The testing of the sample from Example 6 also showed that high filler loading can be achieved without increasing the viscosity beyond the usable range of the adhesive.

Examples 12 and 13

In Examples 12-13, moisture-curable adhesive compositions, listed in Table 3 below, were generally prepared by the following procedure: a white adhesive was made by mixing a polypropyleneoxide with a methyldimethoxysilyl functional group sold under the tradename MS Polymer S303H by Kaneka of Osaka, Japan in a low speed Sigma Blade Lab Mixer from Teledyne Readco of York, Pa. keeping the mixer covered to minimize moisture pickup. The Sigma Blade Lab Mixer was started on a low speed and the following were added: a butyl benzl phthalate sold under the tradename Santicizer 160 by Solutia, Inc. of St. Louis, Mo.; a calcium carbonate sold under the tradename Wingdale White by Imerys of Roswell, Ga.; a titanium dioxide whitener sold under the tradename Tiona RCL-9 by Millenium Inorganic Chemicals Inc. of Baltimore, Md.; a fumed amorphous silica filler with a surface area of 200 m$^2$/gram sold under the tradename Aerosil 200 by Degussa Corporation of Ridgefield Park, N.J.; a substituted benzotriazole anti-oxidant sold under the tradename of Tinuvin 327 by Ciba Specialty Chemicals of Tarrytown, N.Y.; a hindered amine light stabilizer anti-oxidant sold under the tradename of Tinuvin P by Ciba Specialty Chemicals of Tarrytown, N.Y.; and a sterically hindered phenolic anti-oxidant sold under the tradename Irganox 1010 by Ciba Specialty Chemicals of Tarrytown, N.Y.

The mixer was then sealed and heated to between 71° C.-77° C. While heating, a vacuum was pulled on the mixer to continuously distill off any water in the mixture. The mixture was tested after reaching the target temperature to determine whether the target moisture level of less than 1000 ppm was obtained. The heating and vacuum were continued until this target was achieved. Once attained, the heat was shut off and the vacuum broken.

Once the batch had cooled to less than 50° C., then a vinyl trimethoxysilane dehydrating agent sold under the tradename Silquest A-171 Silane by Witco OSI Specialties of Danbury, Conn. was added to the mixture and mixed at low speed for 5 minutes. Afterwards, a N-(3-trimethoxy-1,2-ethanediamine) silane adhesion promoter sold under the tradename Silquest A-1120 by Witco OSI Specialties of Danbury, Conn. was added to the mixture and mixed at low speed for 5 minutes. Afterwards, a dibutyl tin oxide in diisooctyl phthalate catalyst sold under the tradename FomRez SUL-11A by Witco OSI Specialties of Danbury, Conn. was added to the mixture, a vacuum was drawn and the mixture was mixed at low speed for 5 minutes. The mixture was then transferred to an air-tight container for further testing.

TABLE 3

| Raw Material | Ex. 11 | Ex. 10 |
|---|---|---|
| Kaneka S303 H Polymer | 134 | 400 |
| Kaneka MAX 601 Polymer | 0 | |
| Norsolene S105 | 122 | 0 |
| Calcium Carbonate | 625 | 0 |
| Santicizer 100 Plasticizer | 0 | 220 |
| Wingdale White Cal.Carbonate | 0 | 550 |
| Tiona RCL-9 Titanium Dioxide | 0 | 50 |
| Tinuvin 327 Antioixdant | 1.8 | 3 |
| Tinuvin P Light Stabilizer | 0 | 3 |
| Tinuvin 770 Light Stabilizer | 1.8 | 3 |
| Irganox 1010 Antioixdant | 6.2 | 0 |
| Aerosil R972 | 0 | 6 |
| Silquest A-171 Silane (Dehydrating Agent) | 4.5 | 10 |
| Silquest A-1120 Silane (Adhesion Promoter) | 0 | 0 |
| Silquest A-2120 Silane (Adhesion Promoter) | 0 | 6 |
| FomRez SUL-11A Catalyst | 4.5 | 0 |

The viscosity of the adhesive composition of Example 12 was measured initially and after 24 hours. The initial viscosity (Brookfield T/D at 5 rpm) equal 332,000 cps. 24 hour viscosity equals 370,000 cps. The shear strength of the adhesive composition of Example 12 were as follows:

| | |
|---|---|
| 24 hours | 181.2 psi |
| 48 hours | 188.2 psi |

The shear strength resulted in substrate failure.

The sample is difficult to process due to the high viscosity of the formulation, but did provide moisture curable adhesive product with properties to make it a functional adhesive.

The examples show one of the adhesive compositions preferably as a single part adhesive composition with the various possible components noted above. This adhesive composition provides for many of the uses in non-heavy industrial gluing applications that the kit need only comprise two other adhesive compositions including a cyanoacrylate composition and an epoxy adhesive composition.

We claim:

1. An adhesives kit comprising:
   a cyanoacrylate adhesive;
   a second adhesive formulation comprising an epoxy curing agent two component adhesive that cures after the two components are activated by mixing together or heating; and
   a third adhesive formulation comprising a modified silicone-containing adhesive comprising:
   a polymer or copolymer having one or more reactive silicon end groups;

from about 0.01 to about 50 percent by weight of a blend of clear fillers that will not substantially interfere with the production of clear adhesive comprising i) fumed silica having a surface area of less than 150 m²/gram, and ii) clear filler selected from the group consisting of glass microbeads, glass fibers, clear polymer fibers, clear polymer microbeads, clear polymer powders, and combinations thereof having a surface area from 75 to less than 250 m²/gram; and from about 0.01 to about 10 percent by weight of a dehydrating agent;

wherein the modified silicon-containing adhesive has a viscosity from about 1,000 to about 200,000 centipoise and a glass transition temperature of less than −20° C., and a service temperature range of about −60° C. to about 160° C.

2. The adhesive kit of claim 1, further comprising an adhesive selection guide where the guide comprises instructions selected from the group consisting of substrate matching, repair method, adhesive use factors and combinations thereof.

3. The kit of claim 2, wherein the adhesive selection guide comprises a matrix chart comprising:

more than one substrate reference aligned along a first axis and a second axis of the matrix; and more than one symbol of adhesive, wherein each symbol is located at an intersection defined by a substrate reference aligned along the first axis and a substrate reference aligned along the second axis;

wherein a symbol identifies an adhesive that bonds two substrates represented by the substrate reference aligned along the first axis and substrate reference aligned along the second axis.

4. The kit of claim 3, wherein the symbol at the intersection of the substrate references is selected from the group consisting of numbers, letters, geometric shapes, series of shapes, colors and combinations thereof.

5. The kit of claim 2, wherein adhesive selection guide comprises an internet web address connecting to a web site having the matrix chart and optionally at least one utilization factor.

6. The kit of claim 5, wherein the web site is an interactive internet web site that receives user input information on the matrix chart.

7. The kit of claim 1, wherein the modified silicone-containing adhesive comprises a polymer backbone comprising polyalkyl oxide.

8. The kit of claim 7, wherein the one or more reactive silicon end groups comprise alkoxysilane.

9. The kit of claim 7, wherein:
the polyalkyl oxide backbone comprises polyether; and
the one or more reactive silicon end groups comprise alkoxysilane.

10. The kit of claim 7, wherein:
the polyalkyl oxide backbone comprises polyether; and
the one or more reactive silicon end groups comprise methyldiethoxysilane.

11. The kit of claim 7, wherein:
the polyalkyl oxide backbone comprises polyether; and
the one or more reactive silicon end groups comprise triethoxysilane.

12. The kit of claim 1, wherein the modified silicone-containing adhesive comprises one or more reactive silicone end groups selected from the group consisting of triethoxysilane, methyldiethoxysilane, trisilanol, and combinations thereof.

* * * * *